(12) United States Patent
Wang et al.

(10) Patent No.: US 11,433,648 B2
(45) Date of Patent: Sep. 6, 2022

(54) MULTILAYERED DIELECTRIC COMPOSITES FOR HIGH TEMPERATURE APPLICATIONS

(71) Applicant: The Penn State Research Foundation, University Park, PA (US)

(72) Inventors: Qing Wang, Collegeville, PA (US); Qi Li, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 709 days.

(21) Appl. No.: 16/320,919

(22) PCT Filed: Jul. 25, 2017

(86) PCT No.: PCT/US2017/043618
§ 371 (c)(1),
(2) Date: Jan. 25, 2019

(87) PCT Pub. No.: WO2018/052532
PCT Pub. Date: Mar. 22, 2018

(65) Prior Publication Data
US 2021/0280371 A1    Sep. 9, 2021

Related U.S. Application Data

(60) Provisional application No. 62/367,225, filed on Jul. 27, 2016.

(51) Int. Cl.
| | |
|---|---|
| *B32B 17/10* | (2006.01) |
| *C08K 3/20* | (2006.01) |
| *C08K 3/28* | (2006.01) |
| *C08K 3/38* | (2006.01) |
| *C08L 83/14* | (2006.01) |
| *H01G 4/12* | (2006.01) |
| *H01G 4/14* | (2006.01) |
| *H01G 4/20* | (2006.01) |

(52) U.S. Cl.
CPC ............... *B32B 17/10* (2013.01); *C08K 3/20* (2013.01); *C08K 3/28* (2013.01); *C08K 3/38* (2013.01); *C08L 83/14* (2013.01); *H01G 4/1227* (2013.01); *H01G 4/14* (2013.01); *H01G 4/20* (2013.01); *H01G 4/206* (2013.01); *C08K 2003/385* (2013.01)

(58) Field of Classification Search
CPC .................. C08K 2003/2227; C08K 2003/385
See application file for complete search history.

(56) References Cited

U.S. PATENT DOCUMENTS

| | | | |
|---|---|---|---|
| 8,354,166 B2 | 1/2013 | Tan et al. | |
| 10,020,115 B2 | 7/2018 | Wang et al. | |
| 2008/0123250 A1* | 5/2008 | Tan | H01G 4/14 |
| | | | 427/79 |
| 2008/0226815 A1* | 9/2008 | Pramanik | H01L 21/4857 |
| | | | 427/79 |
| 2010/0172066 A1* | 7/2010 | Baer | B32B 27/286 |
| | | | 156/244.11 |
| 2011/0110015 A1* | 5/2011 | Zhang | H01G 4/20 |
| | | | 361/311 |
| 2014/0160623 A1* | 6/2014 | Baer | B32B 15/08 |
| | | | 361/301.4 |
| 2016/0181018 A1* | 6/2016 | Nevitt | B29C 48/495 |
| | | | 361/301.4 |
| 2016/0276105 A1* | 9/2016 | Qi | H01G 4/14 |
| 2018/0257327 A1* | 9/2018 | Ponting | H01G 4/18 |

FOREIGN PATENT DOCUMENTS

| | | | |
|---|---|---|---|
| CN | 100509960 | | 11/2007 |
| JP | 2010-129512 A | * | 6/2010 |
| WO | WO 2015/124698 | | 8/2015 |

OTHER PUBLICATIONS

Azizi et al., "High-Performance Polymers Sandwiched with Chemical Vapor Deposited Hexagonal Boron Nitrides as Scalable High-Temperature Dielectric Materials," Adv. Mater., 29(35):1701864, Sep. 2017.
Chen et al., "Polymer-based dielectrics with high energy storage density," Annu. Rev. Mater. Res., 45:433-58, Jul. 2015.
Hu et al., "Highly enhanced energy density induced by hetero-interface in sandwich-structured polymer nanocomposites" Journal of Materials Chemistry, 39(1):12321-12326, 2013.
Hu et al., "Topological-Structure Modulated Polymer Nanocomposites Exhibiting Highly Enhanced Dielectric Strength and Energy Density," Adv. Funct. Mater., 24(21):3172-3178, Jun. 2014.
International Preliminary Report on Patentability in International Application No. PCT/US2017/043618 dated Feb. 7, 2019, 7 pages.
International Search Report in International Application No. PCT/US2017/043618 dated Apr. 5, 2018, 3 pages.
Li and Wang, "Polymer Nanocomposites for Power Energy Storage,", Chapter 6 in Polymer Nanocomposites: Electrical and Thermal Properties, Eds. X. Huang, C. Zhi, Springer (2016).
Li et al., "Sandwich-structured polymer nanocomposites with high energy density and great charge-discharge efficiency at elevated temperatures," PNAS., 113(36):9995-10000. Sep. 2016.
Li et al., "Solution-processed ferroelectric terpolymer nanocomposites with high breakdown strength and energy density utilizing boron nitride nanosheets" Energy & Environmental Science, 8(3):922-31, Nov. 2014.
Li et al., "Flexible High-Temperature Dielectric Materials from Polymer Nanocomposites," Nature, 523(7562):576-579, Jul. 2015.
Li et al., "High-Temperature Dielectric Materials for Electrical Energy Storage," Annu. Rev. Mater, Res., 48:219-43, Jul. 2018.
Li et al., "Scalable Polymer Nanocomposites with Record High-Temperature Capacitive Performance Enabled by Rationally Designed Nanostructured Inorganic Fillers," Adv. Mater,, 1:1900875, Jan. 2019.

(Continued)

*Primary Examiner* — Marc S Zimmer
(74) *Attorney, Agent, or Firm* — Fish & Richardson P.C.

(57) ABSTRACT

The present document relates to multilayered dielectric composites for high-temperature applications and related methods.

72 Claims, 18 Drawing Sheets

(56) References Cited

OTHER PUBLICATIONS

Li, "High Energy and Power Density Capacitors from Solution-Processed Ternary Ferroelectric Polymer Nanocomposites," Adv. Mater., 26(36):6244-6249, Sep. 2014.

Liu et al., "High-Energy-Density Dielectric Polymer Nanocomposites with Trilayered Architecture," Advanced Functional Materials, 27(20): 1606292, May 2017.

Liu et al., "Poly (methyl methacrylate)/boron nitride Nanocomposites with Enhanced Energy Density as High Temperature Dielectrics," Compos. Sci. Technol., 142:139-44, Apr. 2017.

Wang and Zhu, "Polymer nanocomposites for electrical energy storage," J. Polym. Sci. B Polym, Phys., 49(20): 1421-9, Oct. 2011.

Zhou et al., "A scalable, high-throughput, and environmentally benign approach to polymer dielectrics exhibiting significantly improved capacitive performance at high temperatures," Advanced Materials, 30(49):1805672, Dec. 2018.

Zhu et al., "High Energy Density Polymer Dielectrics Interlayered by Assembled Boron Nitride Nanosheets," Advanced Energy Materials, 1901826, 2019.

\* cited by examiner

MULTILAYERED DIELECTRIC COMPOSITES FOR HIGH TEMPERATURE APPLICATIONS

CROSS-REFERENCE TO RELATED APPLICATION

This application is a National Stage Application under 35 U.S.C. § 371 and claims the benefit of International Application No. PCT/US2017/043618, filed Jul. 25, 2017, which claims priority to U.S. Provisional Application No. 62/367,225, filed Jul. 27, 2016. The disclosure of the foregoing applications are hereby incorporated by reference in its entirety.

GOVERNMENT INFORMATION

This invention was made with government support under Grant No. N00014-11-1-0342, awarded by the Office of Naval Research. The Government has certain rights in the invention.

TECHNICAL FIELD

The present document relates to high-temperature multilayered dielectric composites and methods related thereto.

BACKGROUND

Polymer dielectrics are used for high-energy capacitive storage devices because they are lightweight materials that are easy to manufacture and have a high dielectric strength. However, polymer dielectrics are often limited by a relatively low operating temperature. The performance of polymers dielectrics can deteriorate at high operating temperatures, and therefore may not be suitable for applications that occur under high temperature conditions. Although polymer nanocomposite-based dielectrics are currently available, these materials generally possess limited energy density at high temperatures that presents a major barrier to achieving significant reductions in the size and weight of energy devices and systems.

SUMMARY

Disclosed herein are various embodiments of multilayered dielectric composites and related methods. In particular, the multilayered dielectric composites described herein are suitable for high-temperature applications (e.g., 150° C. or higher).

The energy-storage goal of a polymer dielectric material with high energy density, high power density and excellent charge-discharge efficiency for electric and hybrid vehicle use has been achieved by the embodiments disclosed herein. In particular, this document discloses a unique three-dimensional sandwich-like structure that protects the dense electric field in the polymer/ceramic composite from dielectric breakdown.

The inventors of the present disclosure had to overcome some issues to achieve the novel energy-storage goal. For example, the inventors found that although polymers are ideal for energy storage for transportation due to their light weight, scalability and high dielectric strength, the existing commercial polymer used in hybrid and electric vehicles (e.g., BOPP) cannot stand up to the high operating temperatures without considerable additional cooling equipment. This adds to the weight and expense of the vehicles. Furthermore, in normal two-dimensional polymer films (e.g., BOPP), increasing the dielectric constant, the strength of the electric field, is in conflict with stability and charge-discharge efficiency. The stronger the field, the more likely a material is to leak energy in the form of heat. This problem may be addressed by mixing different materials while trying to balance competing properties in a two-dimensional form. However, such a design can increase the energy capacity, but is still prone to breakdown at high temperatures.

The inventors of the present disclosure have thus developed a number of novel three-dimensional structures composed of multiple nanosized materials organized in specific locations within the structure that can operate at high temperatures (e.g., 150° C.). For example, certain embodiments provided herein include a sandwich structure in which top and bottom layers block charge injection from the electrodes and a central layer includes a high dielectric constant ceramic/polymer filler material that improves the energy and power density of the overall structure. In some embodiments, the outer layers are excellent insulators composed of boron nitride nanosheets in a polymer matrix, while the central layer is a high dielectric constant material such as barium titanate. The inventors have shown herein that the exemplary sandwich structure can withstand a high temperature condition for 24 hours straight over more than 30,000 cycles without any signs of degradation. Furthermore, a comparison provided herein of BOPP and the sandwich structure nanocomposite, termed SSN-x, in which the x refers to the percentage of barium titanate nanocomposites in the central layer, shows that at 150 degrees C., SSN-x has essentially the same charge-discharge energy as BOPP at it typical operating temperature of 70 degrees C. However, SSN-x has several times the energy density of BOPP, which makes SSN-x highly preferable for electric vehicle and aerospace applications as an energy storage device due to the ability to reduce the size and weight of the electronics significantly while improving system performance and stability. The elimination of bulky and expensive cooling equipment required for BOPP is an additional bonus.

Various embodiments of the multilayered dielectric composites provided herein include composites having a three-dimensional structure that contains one or more composite layers. In some cases, a multilayered composites provided herein can be "sandwich-structured polymer composites." The sandwich-structured composite provided herein, in some embodiments, can include two outer layers, which have the same or similar composite composition, sandwiching an inner layer having a different composite composition than the outer two layers. The sandwich-structured composites can provide the advantages of providing an efficient route to high-temperature dielectric composites simultaneously possessing high dielectric constant and low dielectric loss. The sandwich-structured composites provided herein are capable of integrating the complementary properties of spatially organized multi-components (e.g., multi-layers) to yield surprising results. The spatially organized composites provided herein are composites that are spatially oriented in three directions (e.g., x, y, and z-direction). For example, the width and length of the composite may be defined by the perimeter dimensions of the individual layers, while the height of the composite is defined by the number of and thickness of the layers.

Energy density and dielectric loss are typically regarded as divergent parameters, where an improvement in one parameter typically yields undesirable results in the other. Since the energy density of dielectric materials is proportional to the K-value, increasing the K-value may achieve high energy densities for enabling the miniaturization of electronics as well as improvements of system performance and reliability. In electric vehicles, as capacitors occupy about 35% of the inverter volume, a 100% increase in the energy density can directly translate to more than 17% reduction in the inverter size. However, inherently high loss is typically associated with high K-value materials. Thus, increases in the energy density arising from the high K-value component might not lead to actual improvement of discharged energy density owing to exponentially increased dielectric loss and associated degraded η-value with electric field and temperature. The η-value is an important metric to consider since the heat generated from dielectric loss can significantly reduce both lifetime and performance of energy devices. Many of the currently available composites are exclusively designed for film capacitors operating at ambient temperature and have had limited success in high-temperature applications.

The sandwich-structures, as well as other composites structures provided herein, can however raise the dielectric constant and provide improved discharged energy densities while also retaining low dielectric loss (which is also referred to as "conduction loss") and high charge-discharge efficiency (η, η is the ratio of the discharged energy density ($U_e$) versus the stored energy density; at elevated temperatures (e.g., 150° C. or higher). Accordingly, the novel composites provided herein can have both a high energy density and a high charge-discharge efficiency at elevated temperatures.

The demand for a new generation of high-temperature dielectric materials having desirable capacitive energy storage properties is being driven by the rise of high power applications such as electric vehicles, aircrafts, and pulsed power systems. In such applications, the power electronics are exposed to elevated temperatures and high electric fields. For example, under operating conditions generally relevant to electric vehicle applications (e.g., an operating temperature of 150° C. and an electric field strength of 200 MV $m^{-1}$), the composites provided herein can surprisingly provide a highly desirable energy density, power density, charge-discharge efficiency, and/or cycleability. The excellent dielectric and capacitive properties of the composites provided herein may allow for widespread applications in modern electronics and power modules where harsh operating conditions are present.

In one aspect, a composition includes a first layer comprising a polymer and an insulating inorganic filler; a second layer comprising the polymer and a polarizing inorganic filler; and a third layer comprising a same or substantially similar composition to the first layer or the second layer. The polymer has a glass transition temperature or a degradation temperature of about or greater than about 150° C. The composition has a discharged energy density of about or greater than 0.6 J $cm^{-3}$, a charge-discharge efficiency of about or greater than 75%, and a dielectric constant of about or greater than 4, over a temperature range of about 20° C. to about 150° C. and with an applied alternating electric field having a frequency ranging from about 100 Hz to about 1 MHz, and a maximum operating electric field strength of at least 200 megavolt per meter.

In some cases, the third layer comprises a same or substantially similar composition to the first layer, and the first and third layers are outer layers and the second layer is an inner layer disposed therebetween. In some cases, the third layer comprises a same or substantially similar composition to the second layer, and wherein the second layer and third layers are outer layers and the first layer is an inner layer disposed therebetween.

In some cases, the insulating inorganic filler is selected from the group consisting of boron nitride, silica, clay, alumina, aluminium nitride, diamond, and combinations thereof. In some cases, the insulating inorganic filler comprises boron nitride. In some cases, the polarizing inorganic filler is selected from the group consisting of zirconium dioxide, aluminium oxide, tantalum pentoxide, barium strontium titanate ("BST"), lead zirconate titanate ("PZT"), lead magnesium niobate-lead titanate ("PMN-PT"), and combinations thereof. In some cases, the polarizing inorganic filler comprises barium titanate.

In some cases, the polymer is a crosslinked polymer, and where the crosslinked polymer comprises an epoxy, an unsaturated polyester, a polyimide, a bismaleimide polymer, a bismaleimide triazine polymer, a cyanate ester polymer, a benzoxazine polymer, a benzocyclobutene polymer, a polyalkyd, a phenol-formaldehyde polymer, a novolac, a resole, a melamine-formaldehyde polymer, a urea-formaldehyde polymer, a hydroxymethylfuran, an unsaturated polyesterimide or combinations thereof. In some cases, the polymer comprises crosslinked divinyltetramethyldisiloxane-bis (benzocyclobutene). In some cases, the polymer comprises the following structure:

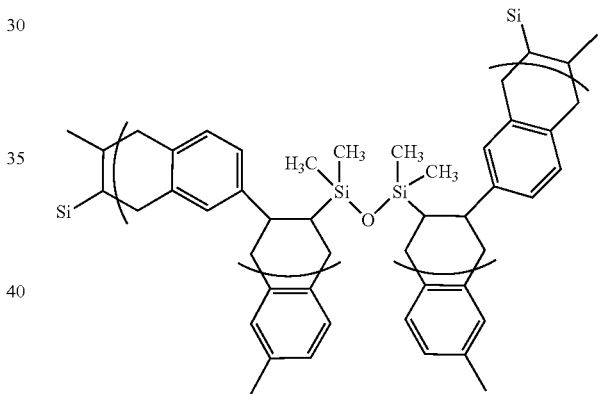

In some cases, the polymer has a dielectric constant of greater than 2.5 over a temperature range of about 20° C. to about 150° C. In some cases, the polymer has an energy density of greater than 0.5 J cm−1 over a temperature range of about 20° C. to about 150° C. In some cases, the polymer has a charge-discharge efficiency of greater than 80% over a temperature range of about 20° C. to about 150° C.

In some cases, the composite is a three-layered structure. In some cases, the composite is a four-layered structure and further comprising a fourth layer.

In some cases, the first layer, the second layer, the third layer, or two or more thereof, each includes a thickness of about 8 microns to about 20 microns. In some cases, the first layer, the second layer, the third layer, or two or more thereof, each includes a thickness less than 3 microns, less than 5 microns, less than 10 microns, less than 15 microns, or less than 20 microns. In some cases, the first layer comprises the insulating filler in a volume fraction ranging from about 1 to 25 vol. %. In some cases, the first layer comprises the insulating filler in a volume fraction ranging from about 1 to 25 vol. %. In some cases, the second layer comprises the polarizing filler in a volume fraction ranging from about 10 to about 35 vol. %. In some cases, the second layer comprises the polarizing filler in a volume fraction ranging from about 20 to about 30 vol. %.

In another aspect, an article comprises a film that comprises a composition that includes a first layer comprising a polymer and an insulating inorganic filler; a second layer comprising the polymer and a polarizing inorganic filler; and a third layer comprising a same or substantially similar composition to the first layer or the second layer. The polymer has a glass transition temperature or a degradation temperature of about or greater than about 150° C. The composition has a discharged energy density of about or greater than 0.6 J cm–3, a charge-discharge efficiency of about or greater than 75%, and a dielectric constant of about or greater than 4, over a temperature range of about 20° C. to about 150° C. and with an applied alternating electric field having a frequency ranging from about 100 Hz to about 1 MHz, and a maximum operating electric field strength of at least 200 megavolt per meter.

In yet another aspect, an article comprises a capacitor, wherein the capacitor comprises the composition that includes a first layer comprising a polymer and an insulating inorganic filler; a second layer comprising the polymer and a polarizing inorganic filler; and a third layer comprising a same or substantially similar composition to the first layer or the second layer. The polymer has a glass transition temperature or a degradation temperature of about or greater than about 150° C. The composition has a discharged energy density of about or greater than 0.6 J cm–3, a charge-discharge efficiency of about or greater than 75%, and a dielectric constant of about or greater than 4, over a temperature range of about 20° C. to about 150° C. and with an applied alternating electric field having a frequency ranging from about 100 Hz to about 1 MHz, and a maximum operating electric field strength of at least 200 megavolt per meter. In some cases, the capacitor is an electric vehicle capacitor.

BRIEF DESCRIPTION OF THE DRAWINGS

FIG. 1A provides a cross-sectional SEM images of the binary crosslinked divinyltetramethyldisiloxane-bis (benzocyclobutene (c-BCB)/barium titanate (BT) polymer nanocomposite. FIG. 1B provides a frequency-dependent dielectric spectra. FIG. 1C provides D-E loops of c-BCB, c-BCB/BT and c-BCB/boron nitride nanosheets (BNNS)/BT nanocomposites. FIG. 1D provides cross-sectional SEM images of a ternary c-BCB/BNNS/BT polymer nanocomposite. FIG. 1E provides electrical conductivity measurements of two single-layer polymer nanocomposites, c-BCB and c-BCB/BT.

FIG. 2A provides a cross-sectional SEM images of a sandwich-structured composite, the SSN-25 sample. The sandwich-structured composites provided herein are termed SSN-x, where "x" stands for the volume fraction of barium titanate nanoparticles (hereinafter "BT NPs") in the central layer. FIG. 2B provides a frequency-dependent K-value and FIG. 2C provides a dissipation factor (DF) of various sandwich-structured composites, with a varied BT content in the inner layer, measured at room temperature. FIG. 2D provides a maximum electric displacement ($D_{max}$) and conduction loss of the various sandwich-structured composites at 200 MV m$^{-1}$ and 150° C. as a function of BT content in the inner layer. FIGS. 2E-2H provide temperature and frequency dependent dielectric spectra of the various composite provided herein.

FIG. 3A provides a discharged energy density and η-value of the exemplary sandwich-structured composites (SSN-x) at 200 MV m$^{-1}$ and 150° C. as a function of BT content in the inner layer. FIG. 3B provides a comparison of the discharged energy density and η-value under 200 MV m$^{-1}$ and elevated temperatures. FIG. 3C provides a Weibull breakdown strength ($E_b$) and the discharged energy density at $E_b$ of the SSN-x samples at 150° C. as a function of BT content in the inner layer. FIG. 3D provides the discharged energy density and η-value of the SSN-25 sample at 150° C. as a function of the electric field. FIGS. 3E-3M provide the capacitive energy storage performance of exemplary composites provided herein having different layer ratios at a temperature of 200° C. and 250° C. Note that "3I" was omitted as a figure identifier.

FIGS. 4A and 4B provide a discharged energy density as a function of time of a sandwich-structured nanocomposite SSN-25 sample and a biaxially-oriented polypropylene (BOPP) sample, respectively, measured in the fast discharge tests under 200 MV m$^{-1}$ at different temperatures. FIGS. 4C and 4D provide a discharged energy density and a power density, respectively, of the SSN-25 and BOPP samples that were obtained from the fast discharge tests under 200 MV m$^{-1}$ at various temperatures. FIGS. 4E and 4F provide cyclic performance of the SSN-25 and polyetherimide (PEI) samples, respectively, at 200 MV m$^{-1}$ and 150° C.

FIG. 6A provides a comparison of discharged energy density and charge-discharge efficiency at 200 MV m$^{-1}$ and 150° C. of the SSN-25 and reverse-SSN samples. FIG. 6B provides a Schottky plot of the various exemplary composites. FIG. 6C provides a P-F plot; and FIG. 6D provides a TSDC spectra of the dielectrics of the various exemplary composites.

Figure 1A:
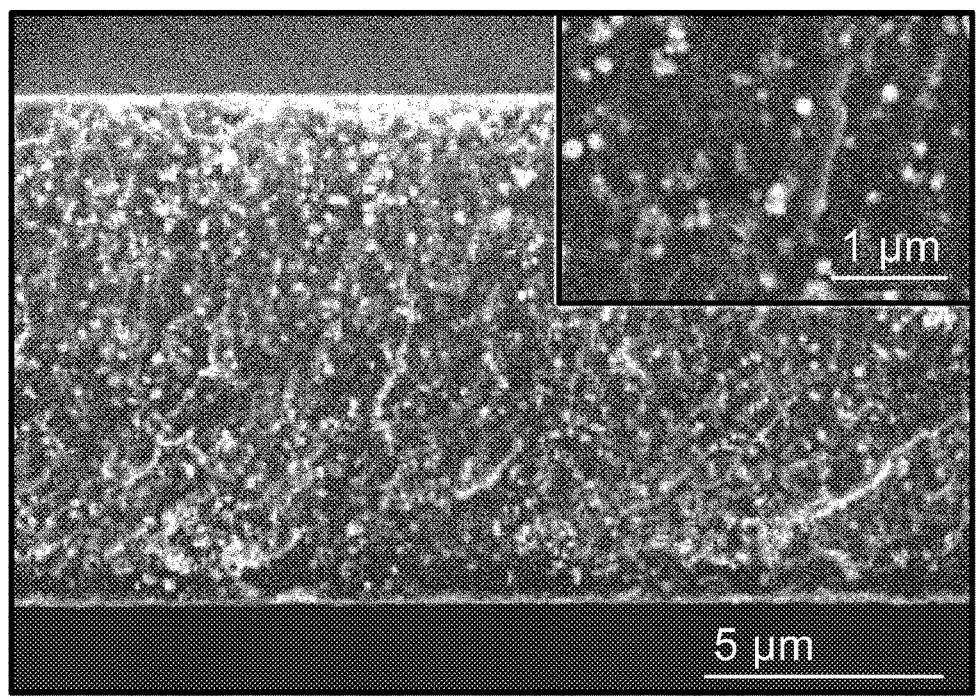
FIGS. 1A-1E are images and figures for single-layer composites.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DETAILED DESCRIPTION

The present document relates to novel multilayered dielectric composites and methods related thereto that can operate at high temperatures. A composite is a material containing two or more phases. In some cases, the composites provided herein are nanocomposites, where at least one of the phases (e.g., a ceramic filler) are nano-sized. In various embodiments, the multilayered composites and methods provided herein may include composites that are capable of performing under high-temperature conditions (e.g., 150° C. or greater) and desired electric field strength conditions (e.g., electric field strength of about 200 MV $m^{-1}$). In particular, some of the embodiments provided herein can include a multilayered composite (e.g., sandwich-structured polymer composites) that can operate at temperatures suitable in an electric vehicle application (e.g., at a temperature of at least 150° C.). For example, the dielectric composites provided herein can operate at a temperature of about or greater than 150° C. and an operating electrical field strength of at least 200 megavolt (mV) per meter.

In some cases, an article includes the composition of the composites provided herein. The article may be a film. The article may be a capacitor. For example, the capacitor can be an electric vehicle capacitor.

The novel composites described herein can provide high energy densities, power densities, and charge-discharge efficiencies at temperatures (e.g., 150° C.) and at an electric field strength (e.g., 200 MV $m^{-1}$) relevant for electric vehicle applications. The development of polymer-based dielectric materials capable of high-temperature operation represents a key element to meeting the technological challenges and to fulfilling the requirements of advanced electronics and electrical power systems.

Film capacitors store electrical energy in dielectric materials in the form of an electrostatic field between two electrodes. Film capacitors generally possess a high power density (on the order of MW) and a high rate capability (on the order of μs) among the electrical energy storage devices and are important for power electronics, power conditioning, and pulsed power applications. DC bus capacitors are essential components in the power inverts of electric vehicles for the conversion of direct current to alternating current that is required to drive the vehicle motor. Compared to ceramics, polymeric materials offer inherent advantages for capacitors, including being lightweight, and having facile processability, scalability, high breakdown strength, and a grace failure mechanism. However, dielectric polymers requiring low operating temperatures (e.g., 70° C.) are unsuitable for the emerging demands for energy storage and conversion in higher temperature environments (e.g., 140° C.) associated with automobile, aerospace power systems and advanced microelectronics. For example, biaxially-oriented polypropylene (BOPP), which may be used in commercially available polymer film capacitors, requires an additional radiator cooling that has to be applied to decrease the environmental temperature from about 140° C. to about 70° C.

Various embodiments of the novel composites disclosed herein can include high-temperature, high-energy-density, dielectric composites concurrently possessing a high K-value, low loss, and a high charge-discharge efficiency (e.g., a high η-value). The composites provided herein can contain complementary properties of spatially organized multi-components (e.g., multi-layers) that include one or more polarizing layers and one or more insulating layers. The polarizing and insulating layers, which will be discussed in greater detail in further sections, can synergistically form a composite structure that surprisingly exhibits a high dielectric constant, a high discharge energy density, and low dielectric loss (e.g., a high η-value).

In general, various embodiments of the multilayered composites provided herein can include two or more layers. For example, the multilayered composite can include up to twenty layers (e.g., two, three, four, five, six, seven, eight, nine, ten, fifteen, or twenty layers). In some cases, the multilayered composite can include more than three, five, ten, or twenty layers. Preferably, the multilayered composite can include three layers (which can also be referred to as a tri-layered composite). In some cases, the layers of the composite can be stacked on top of one another to form a three-dimensional composite structure. Each layer may be either partially or fully disposed on or covered by a different layer within the composite.

The dielectric composites provided herein can, in some cases, function at high temperatures. A high temperature can be defined as a temperature of about 150° C. or higher (e.g., at least 200° C., at least 250° C., at least 300° C., at least 350° C., at least 400° C., at least 500° C., at least 600° C., or at least 700° C. In some cases, a high temperature can be a temperature of about 150° C., about 200° C., about 250° C., about 300° C., about 325° C., about 350° C., about 400° C., about 500° C., about 600° C., or about 700° C. In some cases, a high temperature can be a temperature range from about 100° C. to about 200° C. (e.g., from about 100° C. to about 300° C., from about 100° C. to about 500° C., from about 100° C. to about 700° C., from about 150° C. to about 200° C., from about 150° C. to about 300° C., from about 200° C. to about 300° C., from about 200° C. to about 500° C., from about 300° C. to about 500° C., from about 300° C. to about 700° C., or from about 350° C. to about 500° C.).

In some cases, the composite can have a dielectric constant, a dissipation constant, charge-discharge efficiency, or two or more thereof, that varies by less than 5% over a temperature range of about 25° C. to about 150° C. (e.g., of about 25° C. to about 200° C., of about 25° C. to about 250° C., of about 25° C. to about 300° C., of about 25° C. to about 500° C., of about 25° C. to about 700° C., of about 150° C. to about 200° C., of about 100° C. to about 150° C., of about 100° C. to about 200° C., of about 150° C. to about 300° C., of about 300° C. to about 350° C., of about 350° C. to about 400° C., of about 400° C. to about 450° C., of about 400° C. to about 500° C., of about 450° C. to about 550° C., or of about 400° C. to about 700° C.).

The layer of the composite can include a binary composite containing at least two dielectric materials or components. The binary layer may contain at least one dielectric material that is a polymer (e.g., c-BCB) and at least one dielectric material that is an inorganic material (e.g., barium titanate or BNNS). In some cases, the layer of a composite provided herein contains a polymer matrix. In some cases, the inorganic material may be dispersed uniformly within the polymer matrix. The inorganic material may be well-dispersed throughout the polymer matrix to prevent particle aggregation and to increase the tensile strength of the composite. In some cases, a gradient of the inorganic material may be dispersed in the polymer matrix. In some cases, the inorganic material may be embedded in the polymer matrix in discrete pockets throughout the matrix. In particular, the inorganic material can present in the form of agglomerates in the composite structure, in some cases. In some cases, the presence of agglomerates in the inorganic materials may be used to reduce the tensile strength of the composite and obtain a softer, more flexible material.

In some cases, a layer can include a ternary composite containing at least three dielectric materials or components. In some cases, each layer can include up to ten or more dielectric materials (e.g., up to two, three, four, five, six, seven, eight, nine, ten, or greater than ten dielectric materials or components).

The thickness of each layer (or film) of the composite can range from about 1 μm to about 20 μm (e.g., about 3 μm to about 15 μm, about 5 μm to about 10 μm, about 3 μm to about 10 μm, about 3 μm to about 5 μm, from about 8 μm to about 15 μm, from about 10 μm to about 20 μm, from about 10 μm to about 15 μm, from about 10 μm to about 12 μm, or from about 15 μm to about 20 μm). In some cases, the thickness of any one of the layers can be less than 3 microns, less than 5 microns, less than 10 microns, less than 15 microns, or less than 20 microns.

Dielectric Polymers

The composites provided herein can include at least one "high-temperature polymer." In some cases, the high-temperature polymer is a polymer that does not degrade and/or undergo flow at temperatures below 150° C. (e.g., below 200° C., below 250° C., below 300° C., below 350° C., below 400° C., below 500° C., below 600° C., or below 700° C. In some cases, the polymer is an organic material. In some cases, the polymer has a softening point or flow point that is about or greater than 150° C. (e.g., about or greater than 250° C., about or greater than 300° C., about or greater than 325° C., about or greater than 350° C., about or greater than 400° C., about or greater than 500° C., about or greater than 600° C., or about or greater than 700° C. The softening point or flow point is preferably the glass transition temperature ($T_g$) of the polymer measured in a differential scanning calorimeter at rate of temperature change of 5° C./minute in a nitrogen atmosphere. In some cases, the high-temperature polymer is a polymer having a dielectric constant, a dissipation constant, charge-discharge efficiency, or two or more thereof, that varies by less than 5% over a temperature range of 25° C. to 150° (e.g., over a temperature range of at temperatures below 150° C. (e.g., of about 25° C. to about 200° C., of about 25° C. to about 250° C., of about 25° C. to about 300° C., of about 25° C. to about 500° C., of about 25° C. to about 700° C., of about 150° C. to about 200° C., of about 100° C. to about 150° C., of about 100° C. to about 200° C., of about 150° C. to about 300° C., of about 300° C. to about 350° C., of about 350° C. to about 400° C., of about 400° C. to about 450° C., of about 400° C. to about 500° C., of about 450° C. to about 550° C., or of about 400° C. to about 700° C.).

In some cases, the polymer may include a crosslinked polymer, a thermoplastic polymer or a combination comprising a crosslinked polymer and a thermoplastic polymer. The organic polymer may comprise a block copolymer, a diblock copolymer, a star block copolymer, a triblock copolymer, a dendrimer, an ionic copolymer, a polyelectrolyte, or the like.

Examples of thermoplastic polymers are polybenzoxazoles, polyphthalamides, polyimides, polyamide-imides, polysulfonamides, polyarylates, polyaramids, polyetherketones, polyether ether ketones, or the like, or a combination thereof. Copolymers of these thermoplastic polymers with polysiloxanes may be used if desirable.

Suitable crosslinked polymers may include, but are not limited to, an epoxy polymer, a polyester polymer, a polyimide polymer, a bismaleimide polymer, a bismaleimide triazine polymer, a cyanate ester polymer, a benzoxazine polymer, a benzocyclobutene polymer, an acrylic polymer, a polyketone, a polyalkyd, a phenol-formaldehyde polymer, a novolac, a resole, a melamine-formaldehyde polymer, a urea-formaldehyde polymers, a hydroxymethylfuran, an unsaturated polyesterimide, a polyurethane, or the like, or combinations thereof.

In some cases, the dielectric composite can contain a crosslinked benzocyclobutene. A more preferred polymer can include a crosslinked divinyltetramethyldisiloxane-bis (benzocyclobutene). The structure of divinyltetramethyldisiloxane-bis(benzocyclobutene) prior to crosslinking is shown in the formula (1)

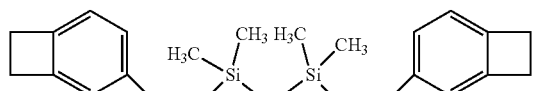

(1)

The structure of divinyltetramethyldisiloxane-bis(benzocyclobutene) after the crosslinking reaction is shown in the formula (2) below:

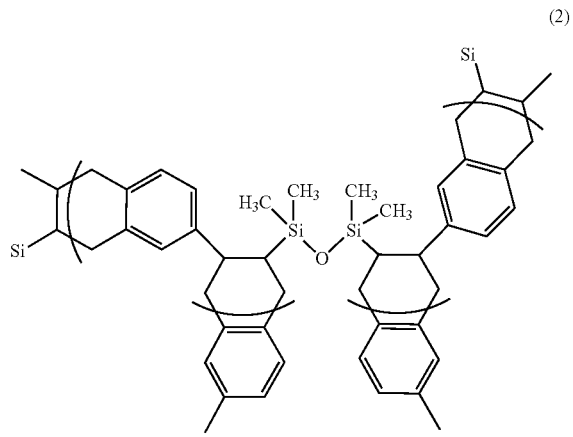

(2)

The BCB molecules of the c-BCB polymer can be reacted to produce composites containing at least one inorganic material, e.g., BNNS, within a polymeric crosslinked structure. The dielectric properties of such composites, e.g., c-BCB/BNNS structures are very stable over a wide range of temperatures (from room temperature to 300° C.) and field frequencies (100 hertz to 1 MHz).

The polymer can be used in amounts of 60 to 95 weight percent (wt. %), preferably 65 to 93 wt. % and more preferably 70 to 92 wt. %, based on the weight of the layer, or the total weight of the dielectric composite.

Dielectric Inorganic Material

The composites provided herein can include inorganic materials, such as a ceramic filler or a metal oxide. The presence of the dielectric inorganic compounds can improve the stored energy density, break down, and/or permittivity of the dielectric composite. In some cases, the composites provided herein can include at least two types of inorganic materials; an insulating filler and a polarizable filler. Each layer of the composite may contain an insulating filler, a polarizable filler, or both. The insulating fillers and the polarizable fillers will be discussed in greater detail in later sections.

The inorganic material (e.g., a ceramic or oxide filler) can be nanometer or micrometer sized. Nanometer sized materials may have a largest dimension that ranges from about 5 nanometers (nm) to 100 nm, preferably from about 10 nm to about 90 nm, or more preferably from about 20 nm to about 75 nm. Nanometer sized materials are termed nanomaterials, and can be used to produce nanocomposites. A term prefaced with "nano" have a largest dimension of 5 to 100 nanometers. Micrometer sized fillers are those having a largest dimension that ranges from 101 nanometers to 5000 nanometers (5 micrometers), preferably 150 to 3000 nanometers and more preferably 200 to 2000 nanometers. Micrometer sized fillers are termed microfillers and are prefaced with the term "micro". In some cases, an exemplary inorganic material, for example, ceramic particles, may have a mean particle size ranging from about 1 nm to about 5000 nm (e.g., from about 5 nm to about 3000 nm, from about 10 nm to about 1000 nm, from about 50 nm to about 500 nm, from about 100 nm to about 300 nm, from about 50 nm to about 200 nm, or from about 75 nm to about 125 nm). In some cases, the ceramic particles have a mean particle size of about 1 nm, about 10 nm, about 50 nm, about 100 nm, about 200 nm, about 300 nm, about 500 nm, or greater than about 500 nm.

The inorganic material (e.g., a ceramic or oxide filler) may have any shape and can be a 1-dimensional material (e.g., a nanowire), a 2-dimensional material (e.g., a platelet) or a three dimensional material (e.g., a spherical particle such as a buckyball). Examples of dielectric organic material shapes include wires (or rods), tubes, platelets, spheres, ellipsoids, pyramids, cones, cubes, sheets, or the like, or a combination thereof. The dielectric fillers may be nanowires, nanotubes, nanodots, nanoplatelets, nanorods, nanoparticles that have spherical shapes, nanosheets, microwires, microtubes, microdots, microplatelets, microrods, microparticles that have spherical shapes, microsheets, or the like, or a combination thereof.

In some embodiments, the 1-dimensional materials and 2-dimensional materials can have aspect ratios of about 5 to 100,000, preferably about 10 to 50,000, and more preferably about 100 to 5,000.

The inorganic material (e.g., a ceramic or oxide filler) can also contain reactive surfaces to form intimate covalently bonded hybrid organic-inorganic homogeneous materials. In some embodiments, the inorganic material (e.g., filler particles) has been surface treated to introduce surface functional groups that allow for the essentially complete co-reactivity with the organic polymer. The functional groups may comprise at least one of hydroxyl, carboxylic, amine, epoxide, silane and vinyl groups.

As discussed above, the composites provided herein are multilayered structures that contain at least two or more portions (e.g., layers), in which at least one portion has a different composition than another portion of the composite. Although further descriptions herein may specifically describe layers of the multilayered composite, such descriptions can be applied generally to any portion of the structure (e.g., a central portion, peripheral portion, and/or a discrete portion therein). The composites provided herein may include one or more polarizing and one or more insulating layers that synergistically form a composite, which simultaneously possesses a high dielectric constant, a high discharge energy density, and low dielectric loss (e.g., a high η-value).

The composites provided herein can include one or more insulating layers containing at least one insulating filler. The insulating filler is an inorganic material that decreases the DF of the composite at high temperatures. The insulating filler can reduce or prevent conduction loss in the composite. In some cases, suitable insulating fillers may include, but are not limited to, boron nitride, silica, clay, alumina, aluminium nitride, diamond, or the like, or combinations thereof. In some cases, the bandgaps of the insulating fillers are about or greater than 5 eV (e.g., about or greater than 7 eV, about or greater than 10 eV, about or greater than 15 eV, about or greater than 20 eV). Under this definition, the insulating filler is an inorganic material that decreases the DF of the composite at high temperatures. Preferably, in some cases, the insulating filler can contain boron nitride materials (e.g., boron nitride nanosheets (BNNSs) and boron nitride nanotubes (BNNTs)). In some cases, the insulating layer consists of a boron nitride material, or more preferably, consists of boron nitride nanosheets.

In some cases, the insulating layer can optionally include additional fillers, which may be organic, inorganic, polarizing, non-polarizing, insulating, or non-insulating. In some cases, the insulating layer does not contain any polarizing fillers. In some cases, the insulating layer does not contain any non-insulating fillers. In some cases, the insulating layer consists of one or more insulating fillers provided herein. In some cases, the insulating layer consists of boron nitride.

The insulating filler may be dispersed in the insulating layer of the composite in any desired amount. In some cases, the amount of the insulating filler is below a threshold percent volume (or percent weight) to prevent formation of a connected pathway of filler particles, which can create or increase electrical conduction in the composite and cause dielectric losses. The electronic conduction is a loss mechanism of dielectrics operating at elevated temperatures and can cause a sharp increase in the dielectric loss as well as substantial reductions in the discharged energy density and the associated η-value with increasing applied fields and temperatures.

In some cases, the insulating layer can include the insulating filler from about 0.5 percent by volume to about 20 percent by volume (e.g., from about 1 percent by volume to about 18 percent by volume, 3 percent by volume to about 17 percent by volume, 10 percent by volume to about 15 percent by volume, or from about 13 percent by volume to about 15 percent by volume). In some cases, the insulating layer can include the insulating filler by no more than 15 percent by volume (e.g., no more than 1 percent by volume, no more than 5 percent by volume, no more than 7 percent by volume, no more than 10 percent by volume, or 13 percent by volume). In some cases, the insulating layer of the composite can include the insulating filler at about 25 percent by volume (e.g., at about 1 percent by volume, at about 5 percent by volume, at about 10 percent by volume, at about 15 percent by volume, or at about 20 percent by volume).

The composites provided herein can include one or more polarizing layers containing at least one polarizing filler. The polarizing filler is an inorganic filler that increases the dielectric constant (k-value) of the composite at high temperatures. In some cases, the polarizable fillers are fillers having a high dielectric constant. For example, in some cases, the polarizable filler has a k-value of about or greater than 8 (e.g., about or greater than 10, about or greater than 12, about or greater than 15) at 1 kHz. In some cases, suitable insulating fillers may include, but are not limited to, barium titanate ("BT"), tantalum pentoxide, barium strontium titanate ("BST"), lead zirconate titanate ("PZT") and lead magnesium niobate-lead titanate ("PMN-PT"), or the like, or combinations thereof. In some cases, an exemplary layer of the composite can include a c-BOB polymer matrix containing barium titanate particles or nanoparticles ("BT NPs").

In some cases, the polarizing layer can optionally include additional fillers, which may be organic, inorganic, polarizing, non-polarizing, insulating, or non-insulating. In some cases, the polarizing layer does not contain any insulating fillers. In some cases, the polarizing layer does not contain any non-polarizing fillers. In some cases, the insulating layer is selected from the group consisting or BT, tantalum pentoxide, BST, PZT, and PMN-PT, or the like, or combinations thereof.

The polarizing filler may be dispersed in the polarizing layer of the composite in any desired amount. In some cases, the amount of the polarizing filler is below a threshold percent volume (or percent weight) to prevent formation of a connected pathway of filler particles in the polarizing layer that can create or increase electrical conduction in the composite and cause dielectric losses (e.g., see FIG. 2C). In some cases, the insulating layer can include the insulating filler from about 0.5 percent by volume to about 50 percent by volume (e.g., from about 1 percent by volume to about 45 percent by volume, 10 percent by volume to about 40 percent by volume, from about 0.5 percent to about 20 percent, 20 percent by volume to about 30 percent by volume, or from about 22 percent by volume to about 28 percent by volume). In some cases, the polarizing layer can include the polarizing filler by no more than 25 percent by volume (e.g., no more than 1 percent by volume, no more than 5 percent by volume, no more than 10 percent by volume, no more than 20 percent by volume, no more than 30 percent by volume, no more than 35 percent by volume, no more than 40 percent by volume, no more than 45 percent by volume, or no more than 50 percent by volume). In some cases, the polarizing layer of the composite can include the polarizing filler at about 50 percent by volume (e.g., at about 1 percent by volume, at about 5 percent by volume, at about 10 percent by volume, at about 15 percent by volume, at about 20 percent by volume, at about 25 percent by volume, at about 30 percent by volume, at about 35 percent by volume, at about 40 percent by volume, at about 45 percent by volume, or at about 50 percent by volume).

In some cases, the insulating layer of the composite can include the insulating filler in an amount that can range from about 0.5 percent by volume to about 25 percent by volume, and the polarizing layer of the composite can include the polarizing filler in an amount that can range from about 0.5 percent by volume to about 25 percent by volume, where the total volume percentage of the insulating and polarizing fillers are no greater than 25 percent by volume (e.g., no greater than 25 percent by volume, no greater than 20 percent by volume, no greater than 15 percent by volume, no greater than 10 percent by volume, no greater than 5 percent by volume, or no greater than 1 percent by volume). In some cases, the insulating layer of the composite includes the insulating filler at about 10 percent by volume and a polarizing layer of the composite includes the polarizing filler at about 15 percent by volume. In some cases, the insulating layer of the composite includes the insulating filler at about 5 percent by volume and the polarizing layer of the composite includes the polarizing filler at about 15 percent by volume. In some cases, the ratio of the total amount of insulating filler to the total amount of polarizing filler in the composite can be about 5:1, about 4:1, about 3:1, about 2:1, about 1:1, about 1:2, about 1:3, about 1:4, or about 1:5. In some cases, the ratio of the first inorganic compound to the second compound in the composite can range from 5:1 to 1:5 (e.g., 5:1 to 1:1, 4:1 to 1:1, 3:1 to 2:1, 3:1 to 1:1, 1:1 to 1:2, 1:1 to 1:3, 2:1 to 1:2, 2:1 to 1:1, 4:5 to 4:1, 4:5 to 4:3, 4:5 to 4:4, or 1:1 to 1:2).

Certain embodiments of the multilayered composites provided herein can include a tri-layered composite. The tri-layered composite may be configured as a sandwich-structured composite. In some cases, the sandwich-structured composite can include two outer layers, which have the same or similar composition, sandwiching an inner layer having a different composition than the outer two layers. In some cases, each layer is a composite film or layer. For example, in some cases, the tri-layered composite may include of a layer of c-BCB/BNNS, a layer of c-BCB/BT, and another layer of c-BCB/BNNS. In some cases, the tri-layered composite contains c-BCB/BNNS outer insulating layers and a polarizing inner layer containing c-BCB/BN NPs. The c-BCB/BNNS insulating outer layers may be used to sandwich the polarizing inner layer containing c-BCB/BN NPs, thus creating the sandwich-structured composite. The amount of BNNSs in the insulating outer layers, or the amount of the BT NPs in the polarizing inner layer, can be of any suitable volume percentage. For example, in some cases, the amount of the BNNS in the insulating outer layers, or the amount of BT NPs in the polarizing inner layer, can be about 10 vol. % (e.g., about 1 vol. %, about 3 vol. %, about 5 vol. %, about 10 vol. %, about 15 vol. %, about 20 vol. %, about 25 vol. %, about 30 vol. %) of the layer. Alternatively, in some cases, the outer layers can be polarizing outer layers and the inner layer can be an insulating inner layer. The tri-layered composite can provide the advantage of providing a structure that is essentially independent of frequency over a wide temperature range (e.g., from room temperature to a temperature of about 150° C.), and/or a low amount of dielectric loss (e.g., less than 7%).

In some cases, the sandwich-structured composites can include BNNS content in each outer layer that ranges from about 1 vol. % to about 25 vol. % (e.g., from 1 vol. % to about 25 vol. %, 3 vol. % to about 20 vol. %, 5 vol. % to about 15 vol. %, 8 vol. % to about 12 vol. %, or 10 vol. % to about 15 vol. %) per layer.

In some cases, the sandwich-structured composites can include BT NP content in the inner layer that ranges from about 1 vol. % to about 35 vol. % (e.g., from 5 vol. % to about 30 vol. %, 10 vol. % to about 30 vol. %, 15 vol. % to about 30 vol. %, 20 vol. % to about 30 vol. %, or 23 vol. % to about 28 vol. %) per layer.

For example, in some cases, the sandwich-structured composites provided herein may include BNNS content in the outer layers that ranges from about 1 vol. % to about 15 vol. % and BT NP content in the inner layer that ranges from about 15 vol. % to about 30 vol. %.

The tri-layered composite provided herein can include three layers having any suitable thickness ratio with respect to one another. In some cases, the tri-layered composite can include three layers having a thickness ratio of a:b:c, where the a, b, and c values can be any value ranging from 1 to 10. For example, in some cases, the tri-layered composite can include three layers with a thickness ratio of 1:2:1, 1:1:1, 2:1:2, or 1:2:3.

The composites provided herein can possess desirable properties at a high temperature. In some cases, the composites provided herein can have a discharged energy density greater than 0.6 J cm$^{-3}$ at a high temperature. In some cases, the composite can have a charge-discharge efficiency greater than 75% at a high temperature. In some cases, the composite can have a dielectric constant greater than 4 (e.g., greater than 4.25, greater than 4.5, greater than 4.75, greater than 5, greater than 5.25, greater than 5.5, greater than 5.75, greater than 6, greater than 6.25, greater than 6.5, greater than 7) at a high temperature. In some cases, the composite can have a dielectric constant less than 7 (e.g., less than 6.5, less than 6.25, less than 6, less than 5.75, less than 5.5, less than 5.25, less than 5, less than 4.75, less than 4.5, less than 4.25) at a high temperature. In some cases, the composite can have a dielectric constant that ranges from about 4 to 7 (e.g., from about 4.5 to about 6.5, from about 4.75 to about 6.25, or from about 5 to about 6.25) at a high temperature.

In some cases, the composites provided herein can be subjected to a desired number of cycles of charge-discharge without significant degradation. For example, in some cases, the composites provided herein can be subjected to about or greater than 30,000 cycles (e.g., about or greater than 1,000 cycles, 5,000 cycles, 7,000 cycles, 8,000 cycles, 10,000 cycles, 15,000 cycles, 20,000 cycles, or 25,000 cycles) of charge-discharge without showing signs of degradation, and the variation of $U_e$ is less than 3% in comparison to the $U_e$ measured in the first cycle. In some cases, the composites provided herein can be subjected to about or over 10,000 cycles of charge-discharge with a variation of $U_e$ that is less than 16% (e.g., less than 15%, less than 12%, less than 10%, less than 8%, less than 5%, less than 3%, less than 1%) in comparison to the $U_e$ measured in the first cycle.

The novel composites provided herein unexpectedly exhibit highly desirable properties (e.g., discharged energy density, charge-discharge efficiency, dielectric constant, dissipation factor, and/or cycling properties) over a temperature range of about 20° C. to about 150° C. and with an applied alternating electric field having a frequency of about 10 Hz and a maximum operating electric field strength of about or at least 200 mV m$^{-1}$. Certain embodiments of the novel structures provided herein include sandwich-structured composites that can provide spatially organized multi-components that exhibit an improved discharged energy density while maintaining a desirable η-value under the operating conditions in electric vehicles (e.g., in DC bus capacitors of electric vehicles). For example, as will be discussed in later sections, the K-value of the sandwich-structured composites can be enhanced to 2.5 and 1.8 times those of BOPP and c-BCB/BNNS materials (see FIG. 3B), respectively, leading to a discharged energy density of about 4.0 J cm$^{-3}$ and a power density of over 590 MW L$^{-1}$ at 150° C. Moreover, the embodiments of the novel composites provided herein can provide significantly improved cyclability and dielectric stability at elevated temperatures, as demonstrated by the experimental data provided herein of some of the exemplary composites.

Methods of Manufacturing

The composites provided herein (e.g., sandwich-structured composite films) may be prepared using a layer-by-layer casting method. A layer-by-layer casting method may be performed by taking a first solution containing monomers for forming a film composed of a desired polymer (e.g., a BCB solution containing 25 mg BCB monomers). An appropriate amount of an inorganic material (e.g., BNNS) may be added to and mixed with the monomer solution. The mixture solution can be drop cast on a substrate, such as a glass plate.

The mixture solution may be subjected to a heating process for a predetermined time duration. For example, the mixture solution of may be heated between 100-150° C. for about 1-4 hours to form a solid film.

A second layer may be cast directly on top of the first layer using a BCB solution containing 50 mg BCB monomers along with the appropriate amount of BT NPs. The first and second layers may be heated to an appropriate casting temperature (e.g., about 100 to about 150° C.) for an appropriate time duration (e.g., about 1-4 hours).

A third layer, and additional subsequent layers, may be cast on top of the second layer using a BCB solution containing 25 mg BCB monomers along with the appropriate amount of BNNSs.

Afterwards, the film can be dried at an appropriate drying temperature (e.g., about 100 to about 150° C.) for an appropriate time duration (e.g., about 5-45 minutes).

The film may be cured at an appropriate drying temperature (e.g., about 200 to about 300° C.) for an appropriate time duration (e.g., about 1-3 hours) in the presence of a curing gas (e.g., nitrogen).

The layer arrangement and thickness ratio of the sandwich-structured composite films can be adjusted as desired by controlling the concentration and composition of the cast solutions.

EXPERIMENTS

Single-Layer Composites

Figure 1B:
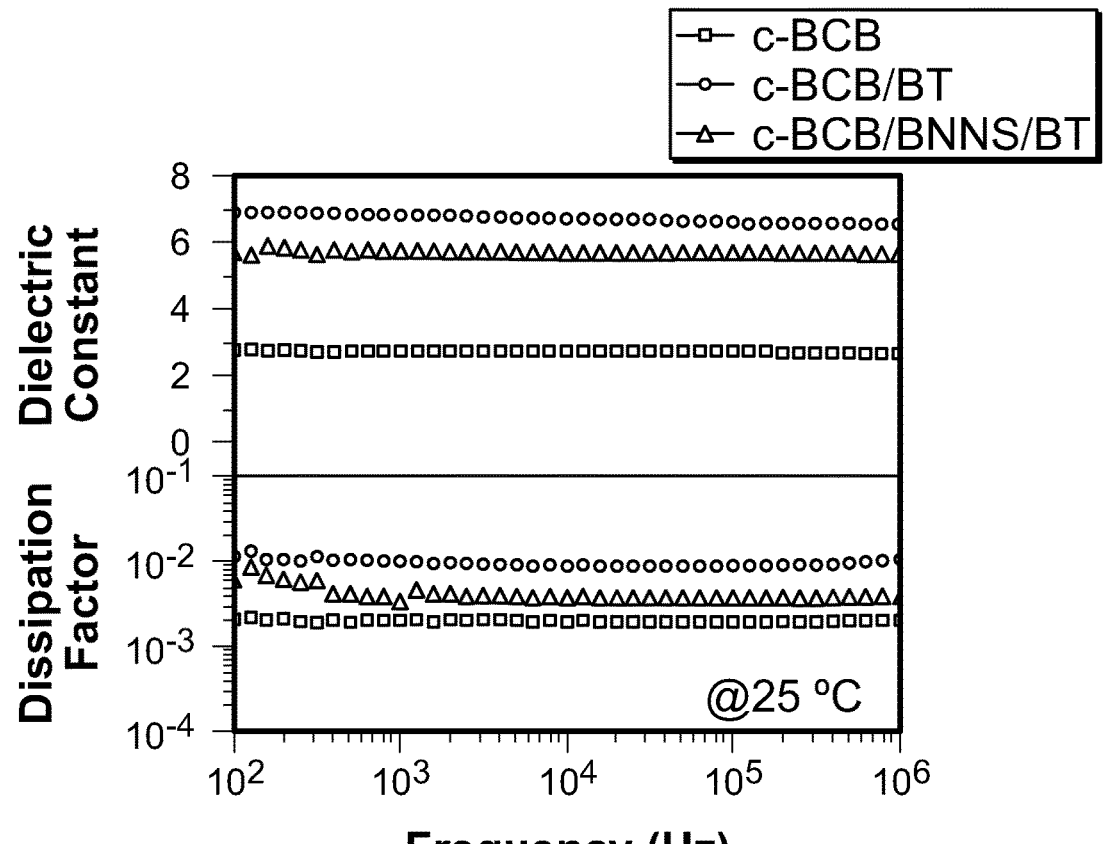
Figure 1C:
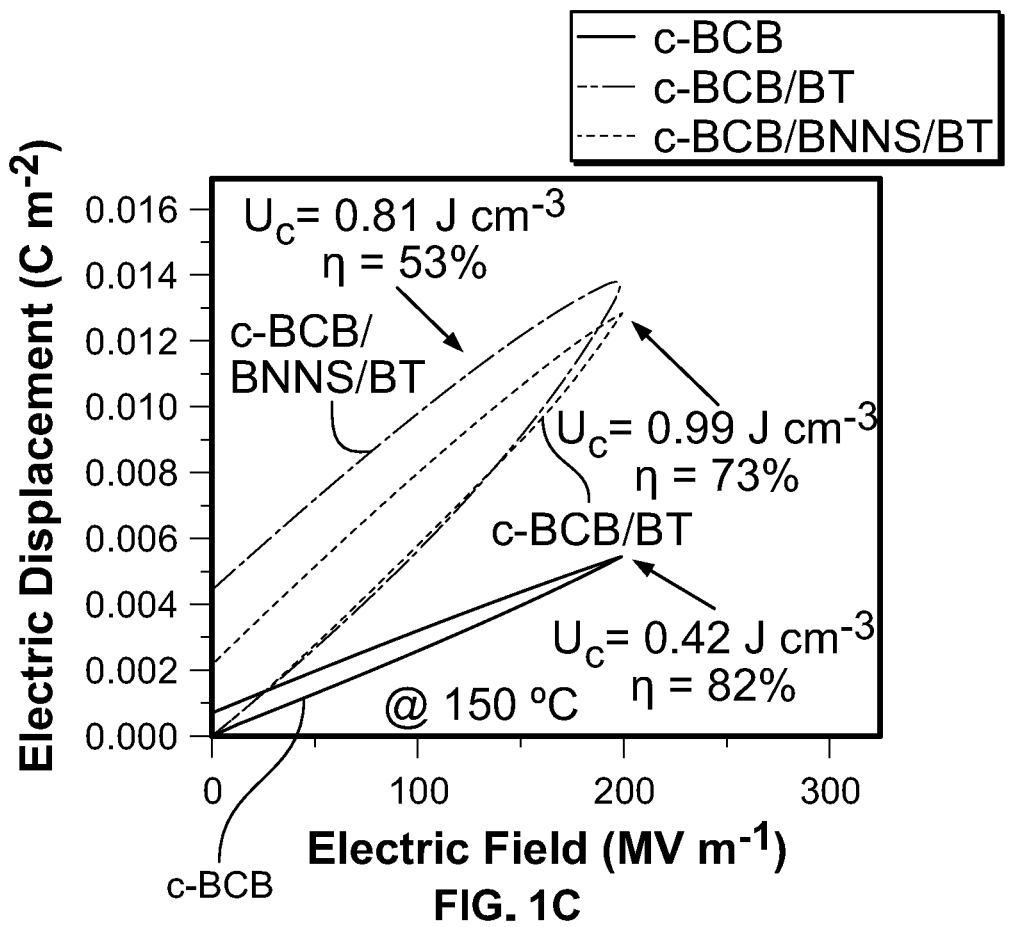

Barium titanate nanoparticles (BT NPs, ~100 nm mean particle size) (FIG. 1A) was added into a c-BCB polymer matrix to yield a binary polymer nanocomposite composed of c-BCB/BT. The c-BCB polymer matrix was filled with approximately 15 vol. % of BT NPs, which is a feeding ratio right below the threshold of the formation of the connected pathway of filler particles (fc=16-18 vol. % for two-phase random media with spherical inclusions). The dielectric spectroscopy measured at room temperature showed a K-value of approximately 6.8 at 1 kHz accompanied by a dissipation factor (DF) of about 0.97% for the c-BCB/BT nanocomposite, as compared with a K-value of about 2.7 and a DF of about 0.25% for a sample containing only c-BCB (FIG. 1B). It is important to note that the low-field room-temperature dielectric loss is drastically different from the loss shown at high electric fields and elevated temperatures because of the nonlinear conduction related to charge injection and leakage current. At 150° C. and 200 MV m−1, the dielectric loss increased rapidly from 18% (see c-BCB sample) to more than 47% (see c-BCB/BT nanocomposite sample), as determined from the electric displacement-electric field (D-E) loops (FIG. 10). Concurrently, a fourfold increase in the leakage current density was observed from the c-BCB sample (4.36×10$^{-8}$ A cm$^{-2}$) as compared to the c-BCB/BT composite sample (1.59×10$^{-7}$ A cm$^{-2}$), according to the electrical conductivity measurements (FIG. 1E), which accounts for the considerable increase in the dielectric loss observed at high fields and elevated temperatures.

Figure 1D:
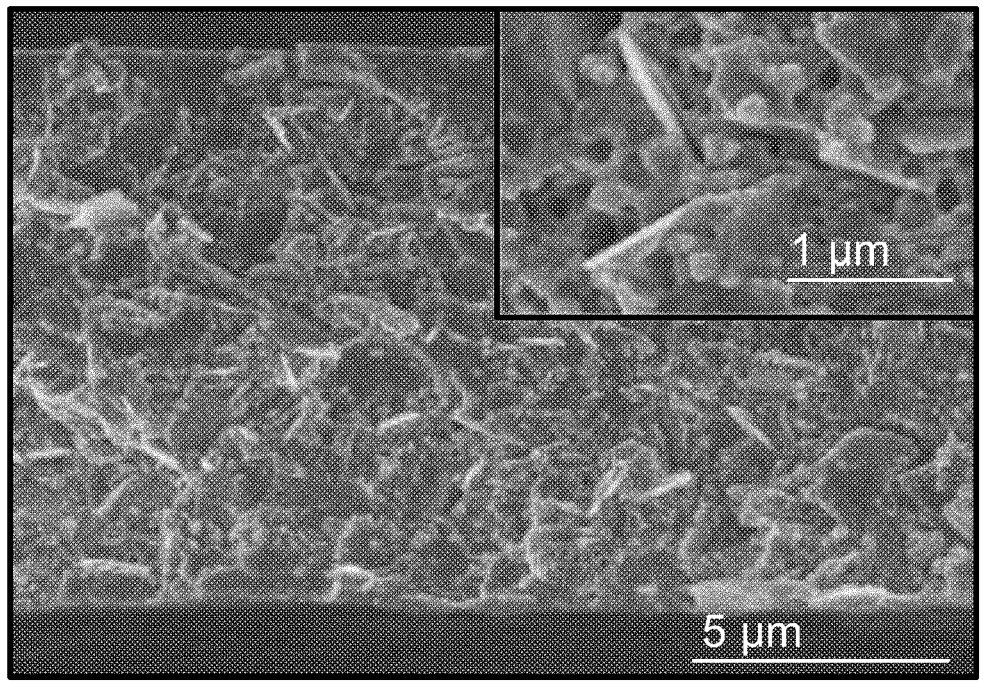
Figure 1E:
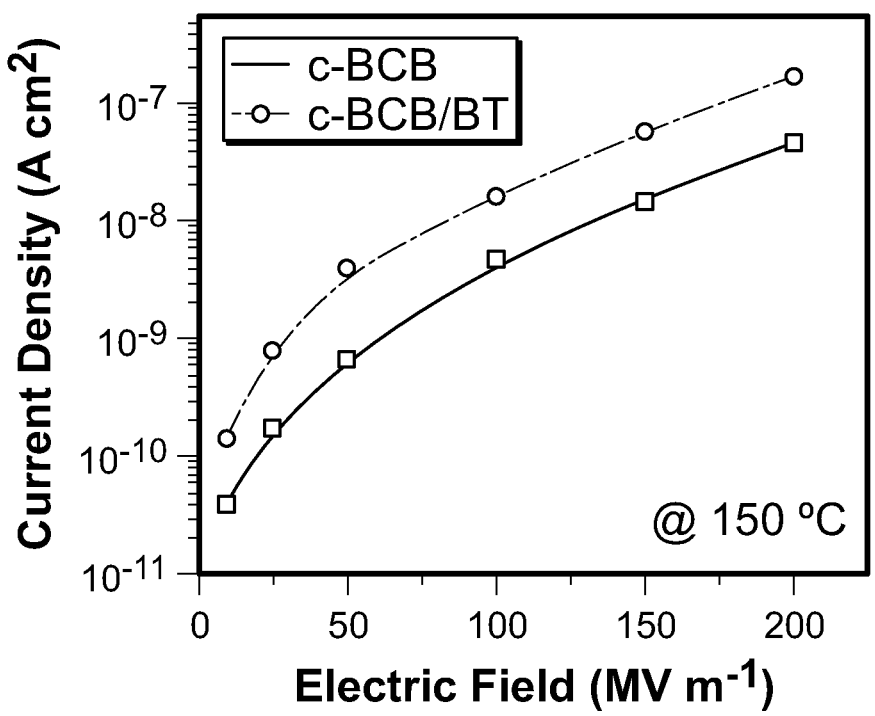

Ternary polymer nanocomposites (c-BCB/BNNS/BT) composed of 10 vol. % BNNS and 15 vol. % BT were also prepared (FIG. 1D). With the introduction of BNNS, the DF value of the ternary nanocomposite (0.36%) was more than 60% lower in comparison with that of the c-BCB/BT sample. The c-BCB/BNNS/BT sample, however, maintained a K-value of about 5.7, which is more than a two-fold increase with respect to the c-BCB sample (FIG. 1B). At 150° C. and 200 MV m$^{-1}$, the conduction loss of the c-BCB/BNNS/BT sample reached as high as 27% (FIG. 10). Although the single-layer film configurations (e.g., binary and ternary composites) showed an improved K-value, there was also a marked increase in dielectric loss at high temperatures.

Sandwich-Structured Polymer Nanocomposites

A. Fabrication

The sandwich-structured nanocomposite films were prepared using a layer-by-layer casting method. As mentioned above, the sandwich-structured composites provided herein are termed as SSN-x, where "x" stands for the volume fraction of BT NPs in the central layer. Take the preparation of the SSN-25 sample as an example. First, a BCB solution containing 25 mg BCB monomers along with the appropriate amount of BNNSs was drop cast on a glass plate. After baking at 120° C. for 3 hours, a second layer was cast directly on top of the first layer using a BCB solution containing 50 mg BCB monomers along with the appropriate amount of BT NPs. Again, after heating the material at 120° C. for 3 h, a third layer was cast on top of the second layer using a BCB solution containing 25 mg BCB monomers along with the appropriate amount of BNNSs. Afterwards, the film was dried at 120° C. for 30 minutes, which was followed by curing at 250° C. for 2 hours under $N_2$ gas. Layer arrangement and thickness ratio of the sandwich-structured nanocomposite films can be tuned by simply controlling the concentration and composition of the cast solutions. The thickness of films was within the range of 8-20 μm.

B. Dielectric Spectra Testing

Figure 2A:
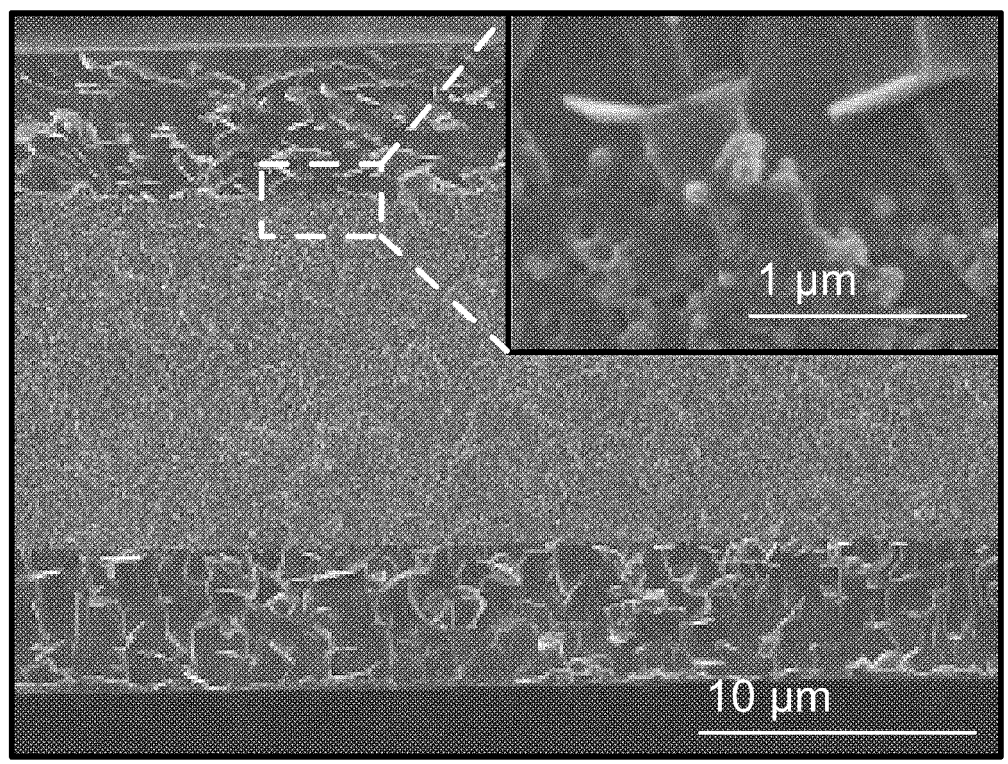
FIGS. 2A-2H are images and figures for exemplary composites provided herein.

Referring to FIG. 2A, tri-layered polymer nanocomposites were prepared by sequentially casting of a layer of c-BCB/BNNS, a layer of c-BCB/BT, and another layer of c-BCB/BNNS with the ratio of thickness in 1:2:1. The volume fraction of BNNSs in the outer layers was fixed at 10 vol. %, while the content of BT NPs in the inner layer was varied.

Figure 2B:
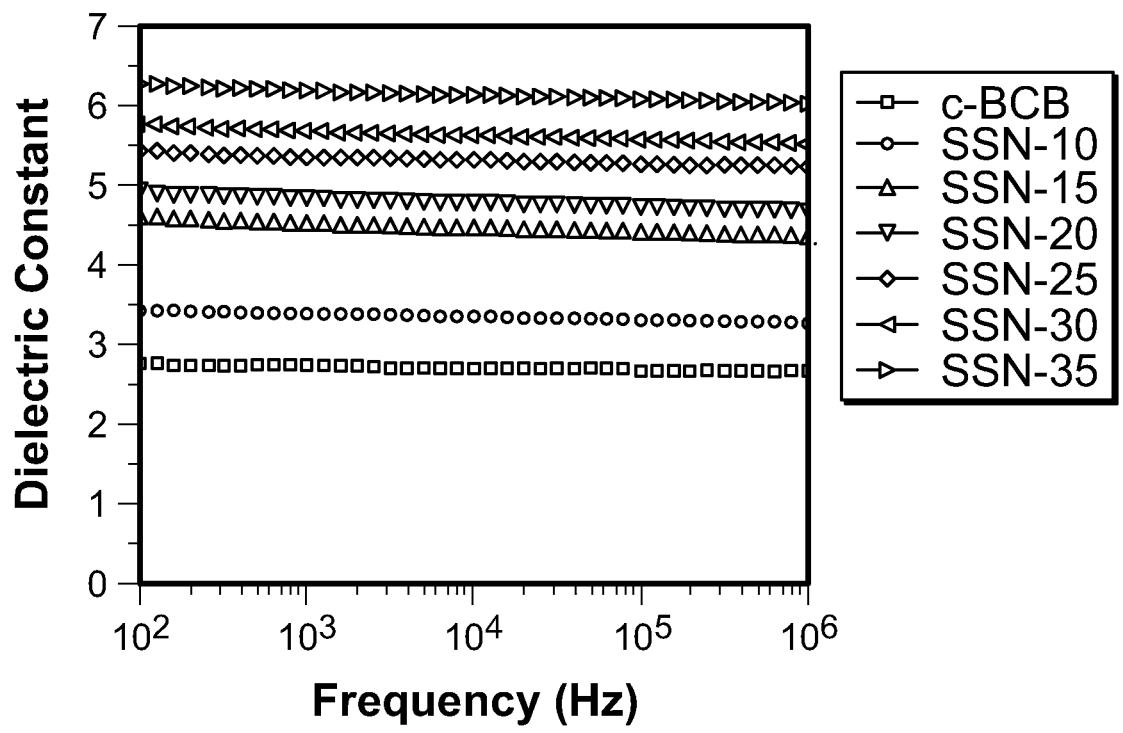

Referring to FIG. 2B, various tri-layered polymer nanocomposite (SSN-x) samples were tested to show how the BT NP content in the central layer affected the K-value of each sample. Generally, an increase in the volume fraction of the BT NPs increased the K-value of the SSN-x sample. As shown in FIG. 2B, the K-values of the SSN-x samples increased from about 3.5 (SSN-10) to over 6.3 (SSN-35).

Figure 2C:
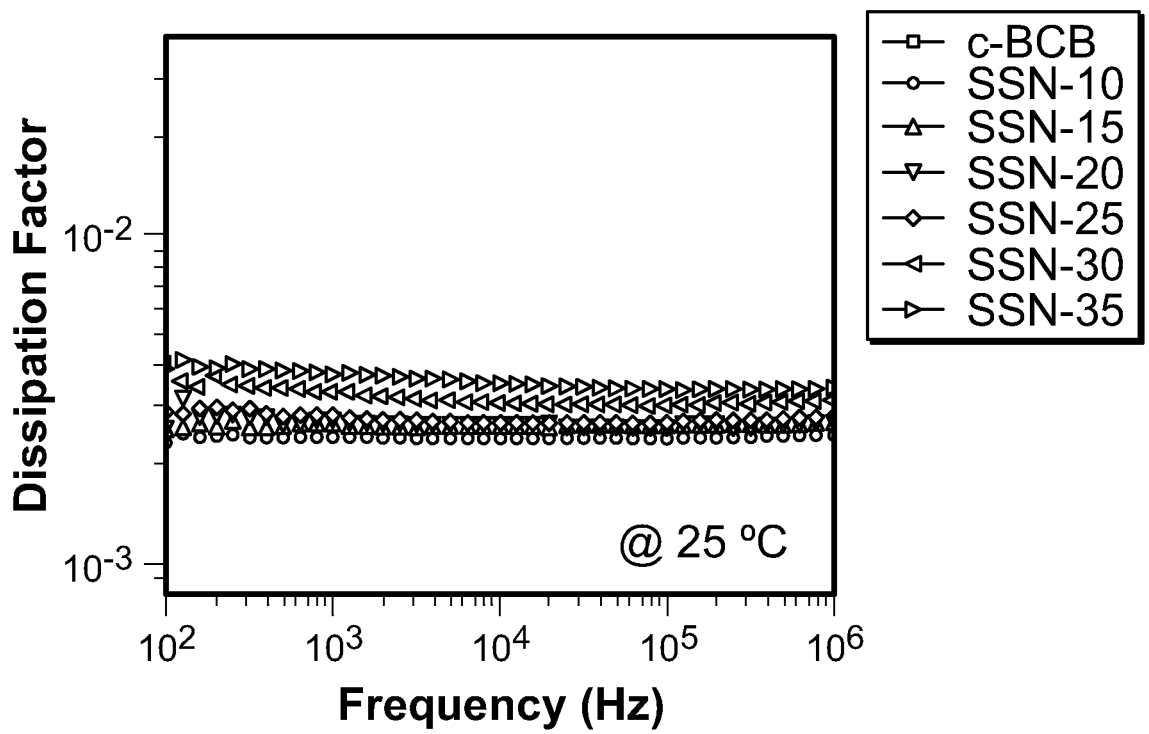

Referring to FIG. 2C, various SSN-x samples were tested to show how the BT NP content in the central layer affected the DF value of each sample. As shown, the depicted DF values varied slightly in the range from 0.25 vol. % to 0.28 vol. % in the SSN-10, SSN-15, SSN-20, and SSN-25 samples. The DF values, however, showed a notable increase when the volume fraction of BT NPs exceeded 25 vol. %, as seen in the DF values of the SSN-30 and SSN-35 samples.

Figure 2D:
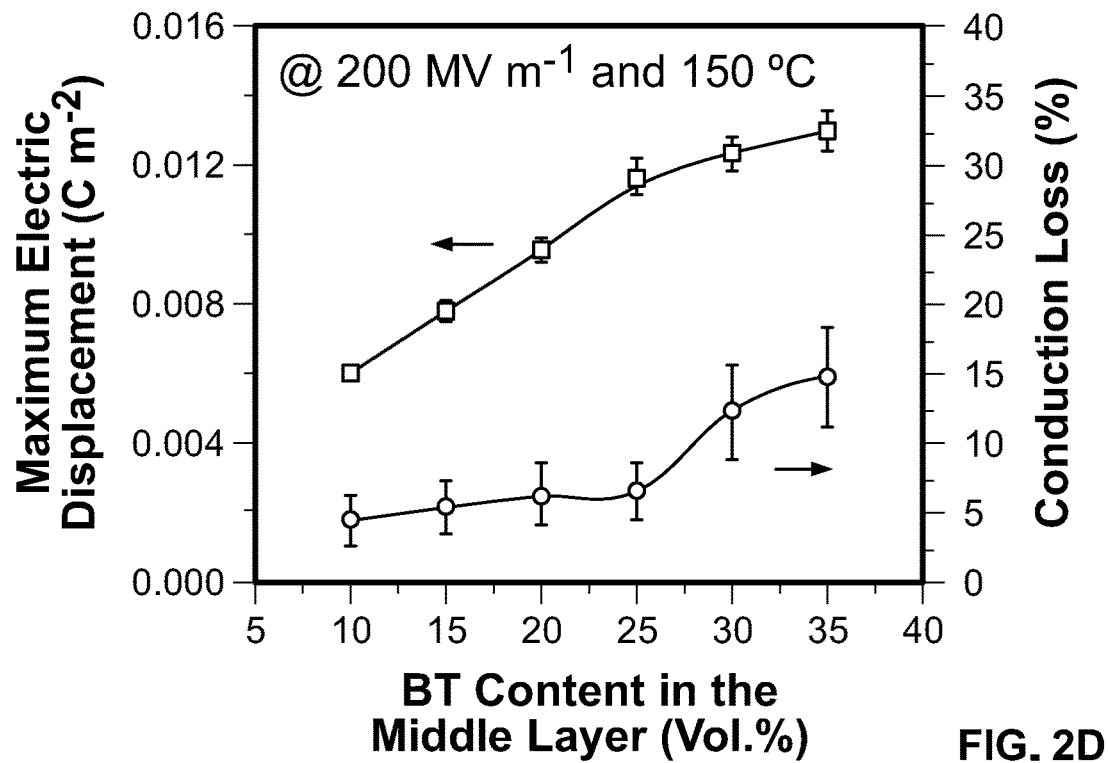
Figure 2E:
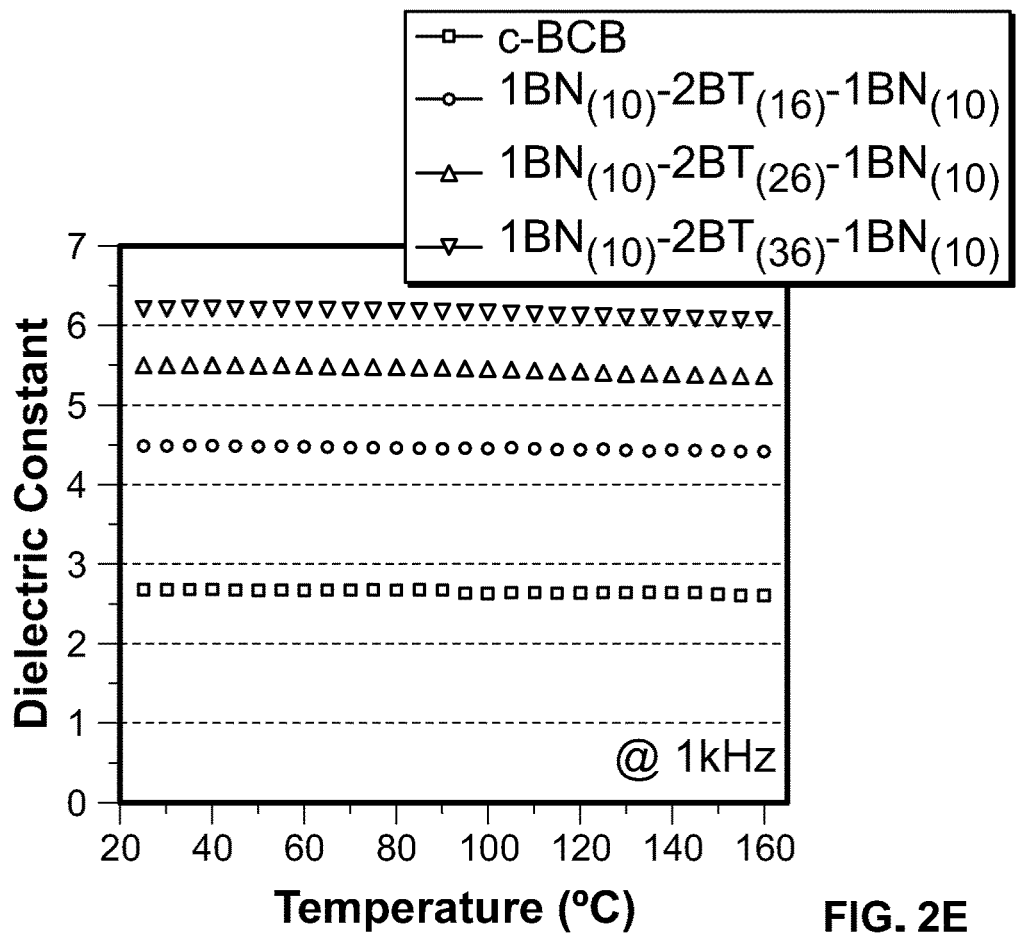
Figure 2F:
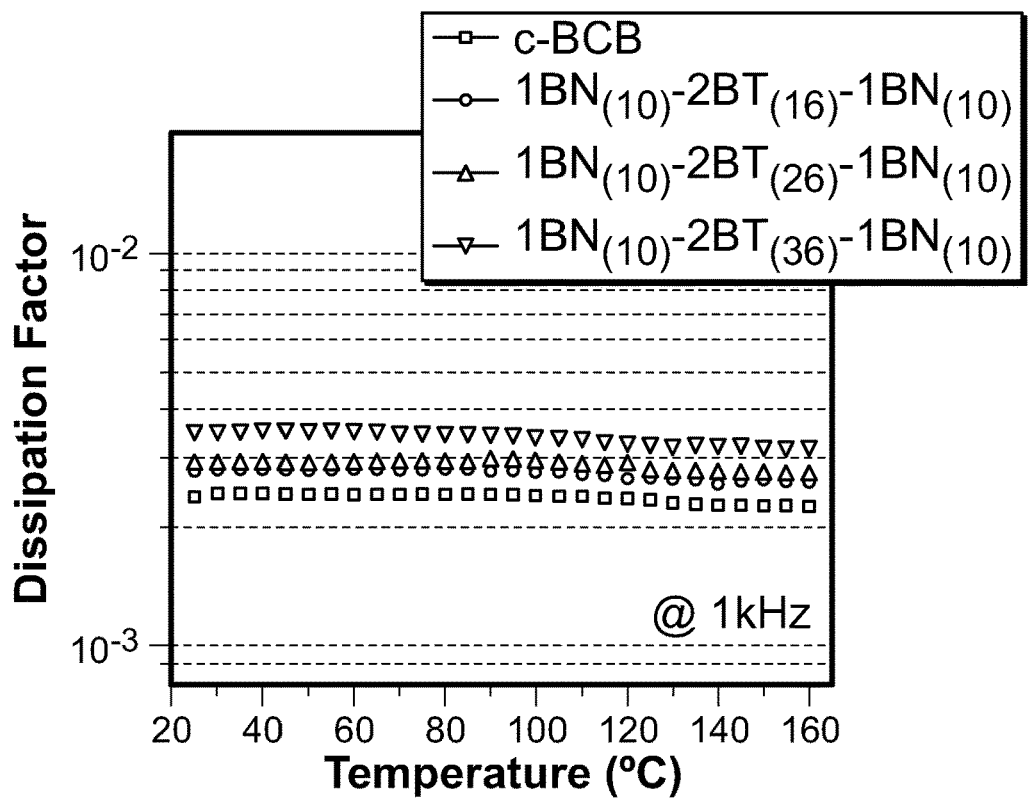

Referring to FIG. 2D, even at 150° C. and 200 MV $m^{-1}$, the dielectric loss of the SSN-x samples with no more than 25 vol. % BT was found to be consistently less than 7%, which is significantly lower than the single-layer binary (c-BCB/BT) and ternary (c-BCB/BNNS/BT) polymer nanocomposites (e.g., 18% to 47% as shown in FIG. 10).

Figure 2G:
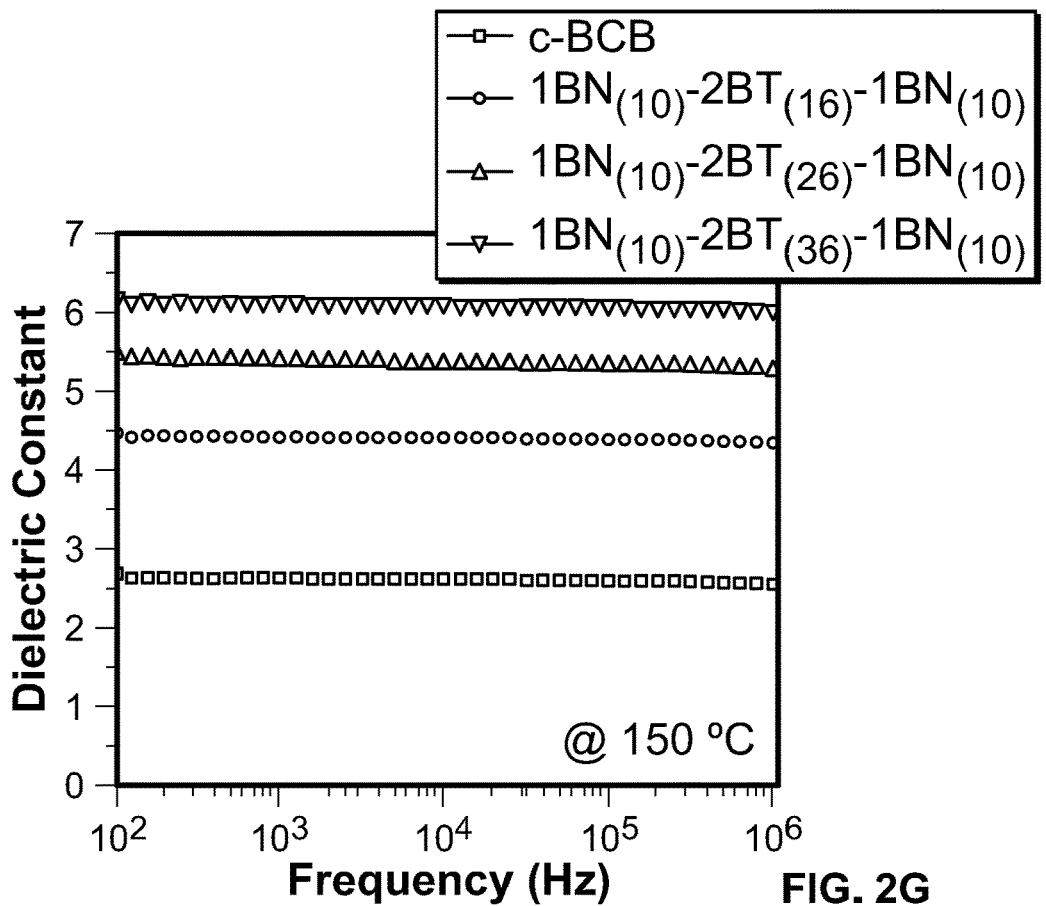
Figure 2H:
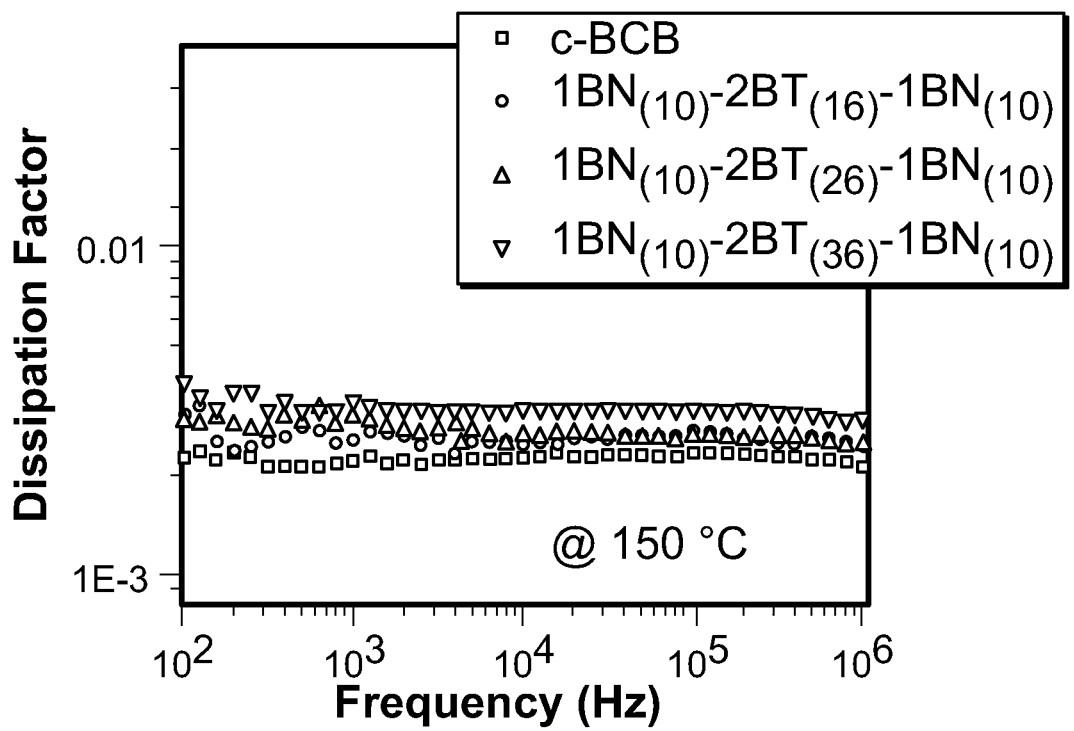

Referring to FIGS. 2E-2H, the dielectric properties of the SSN-x samples were considerably stable with respect to temperatures ranging from 20-160° C. In particular, as shown in FIGS. 2G and 2H, it was also observed that the K and DF values of the SSN-x samples were essentially independent of frequency at room temperature and at 150° C., making these materials highly desirable for power conditioning applications.

C. High-Temperature Capacitive Energy Storage Testing

Figure 3A:
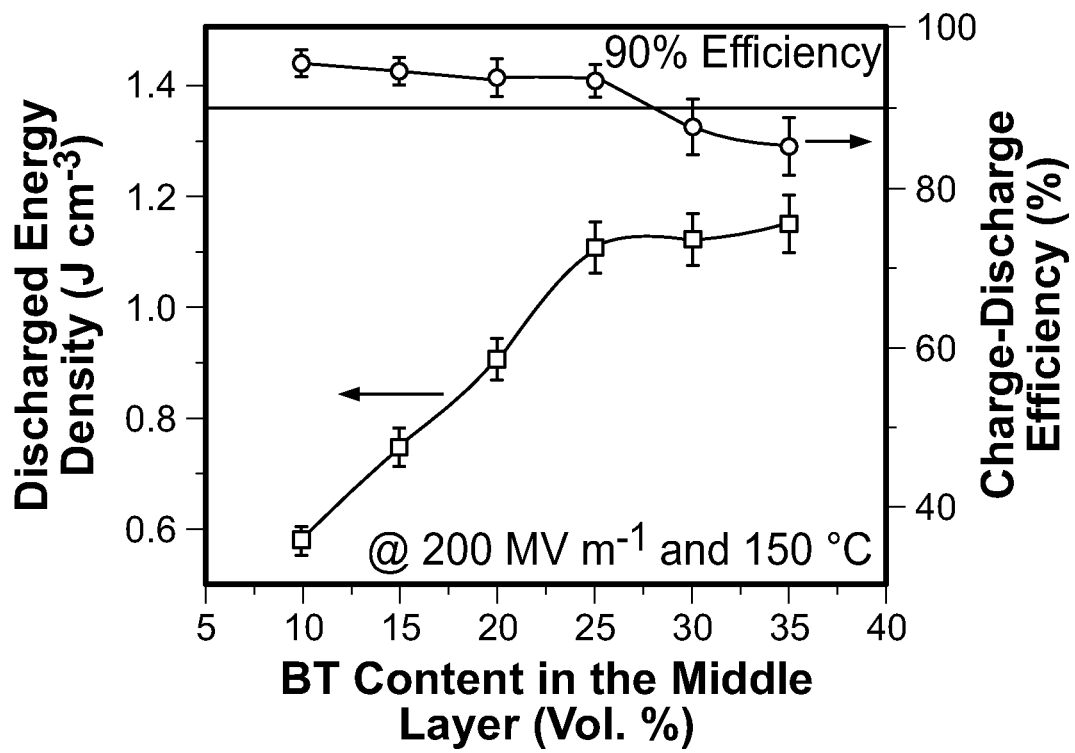
FIGS. 3A-3L are images and figures showing capacitive energy storage performance of exemplary composites provided herein.

Referring to FIG. 3A, an optimal composition of the sandwich-structured nanocomposite was determined to be a structure containing 25 vol. % of BT NPs in the central layer (e.g., the SSN-25 sample). The SSN-25 sample exhibited a discharged energy density of 1.1 J $cm^{-3}$ and a η-value of 93% at 150° C. and 200 MV $m^{-1}$.

Figure 3B:
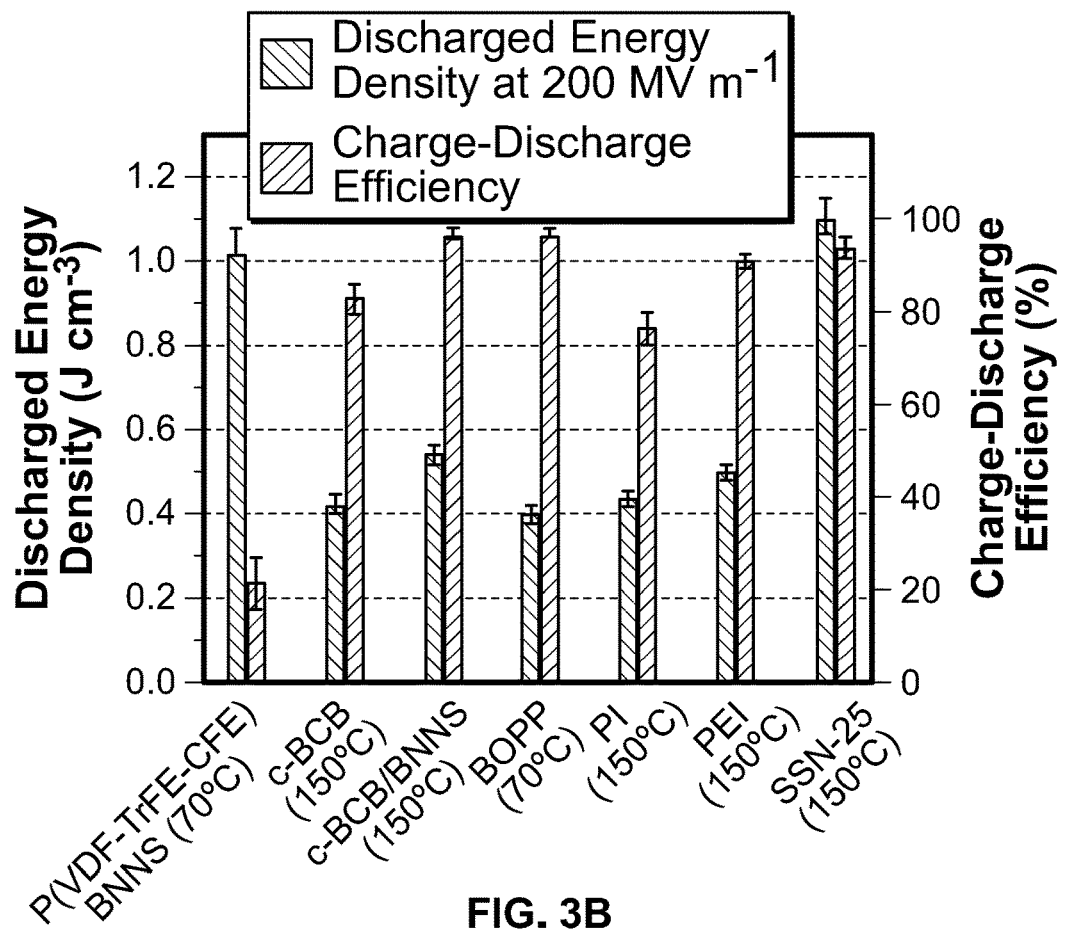

Referring to FIG. 3B, the elevated-temperature energy storage capability of the SSN-25 sample showed to be superior to single-layer polymer nanocomposites, as well as high-temperature dielectric polymers. For instance, the discharged energy density was 0.81 J $cm^{-3}$ with a η-value of 53% for the binary c-BCB/BT single-layer nanocomposite, and the discharged energy density was 0.99 J $cm^{-3}$ with a η-value of 73% for the ternary c-BCB/BNNS/BT single-layer nanocomposite (see FIG. 10). Surprisingly, the discharged energy density of the SSN-25 sample measured at 150° C., which is almost 2.8 times that of a BOPP sample (i.e., 0.4 J $cm^{-3}$) measured at 70° C., was achieved at a η-value comparable to the BOPP sample, i.e., >90%. The ferroelectric polymers represented by poly(vinylidenefluoride-ter-trifluoroethylene-ter-chlorofluoroethylene) (PVDF-TrFE-CFE) possessed the highest K-values among the dielectric polymers. However, the PVDF-TrFE-CFE/BNNS (10 vol. % of BNNSs) nanocomposite with a K-value of 37 at 1 kHz only released a discharged energy density of 1.01 J $cm^{-3}$ with a poor η-value of 21% at 70° C. and 200 MV $m^{-1}$. The SSN-25 sample also well-outperformed the best high-temperature dielectric polymers, e.g., the polyimide (PI) and the polyetherimide (PEI) samples. The discharged energy density attained at 150° C. and 200 MV $m^{-1}$ were 0.43 J $cm^{-3}$ for the PI sample with a η-value of 76% and 0.5 J $cm^{-3}$ for PEI with a η-value of 90%, respectively.

Figure 3C:
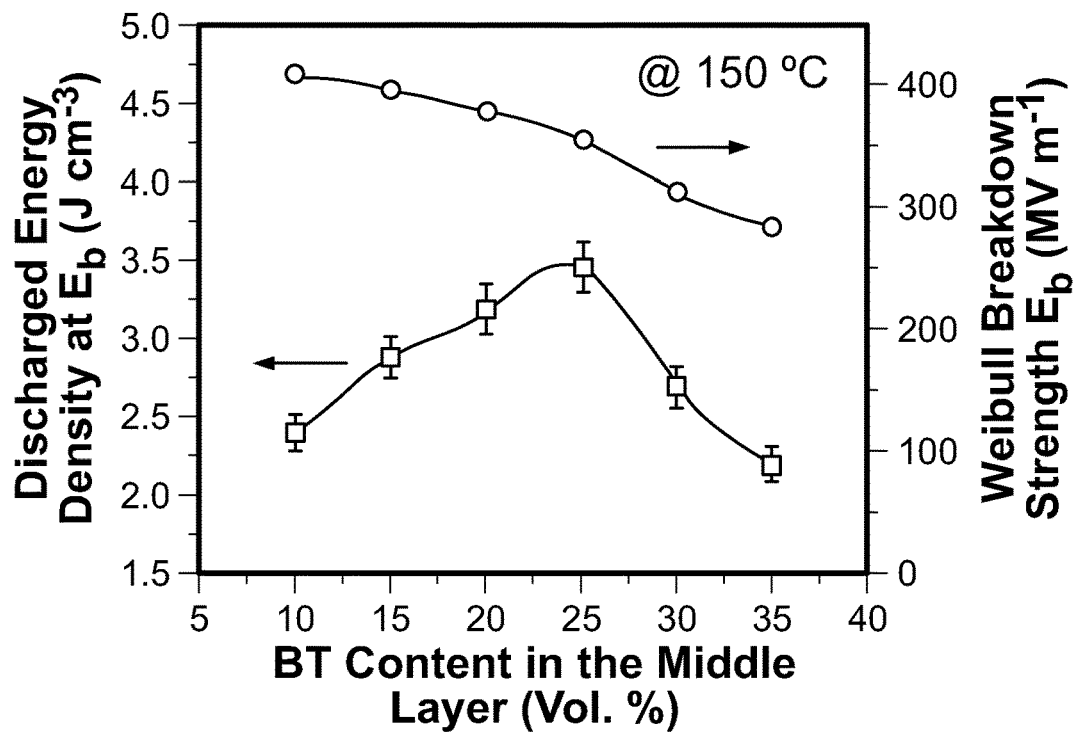

Referring to FIG. 3C, the breakdown strength ($E_b$) of the SSN-x samples with varied volume fractions of BT NPs was analyzed using the two-parameter Weibull statistics. As the BT content in the inner layer was increased, the characteristic $E_b$ measured at 150° C. decreased continuously from 410 MV $m^{-1}$ (SSN-10) to 285 MV $m^{-1}$ (SSN-35). This trend coincides with the conduction loss of the nanocomposites, suggesting that the increase in electrical conduction accelerates dielectric breakdown.

Figure 3D:
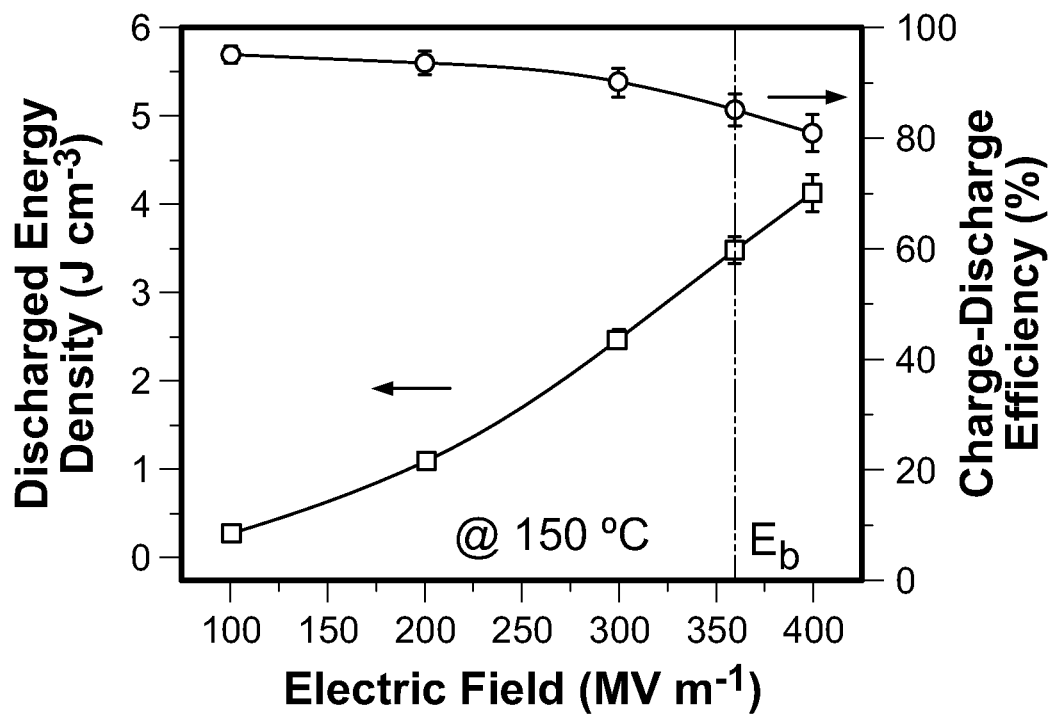
Figure 3E:
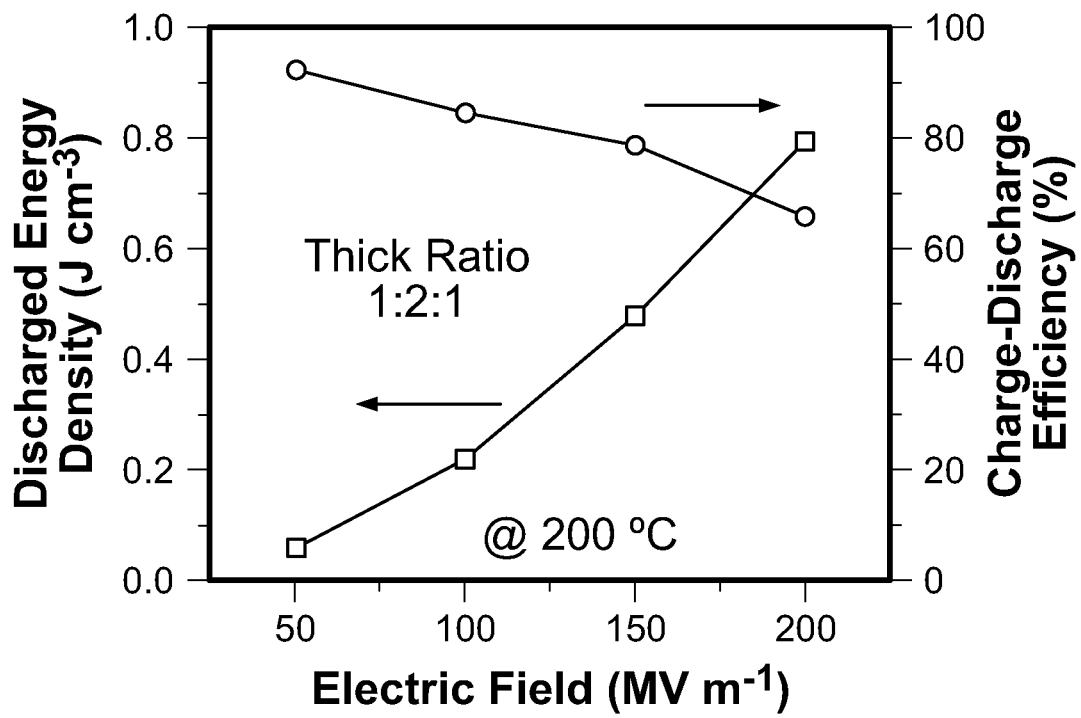
Figure 3F:
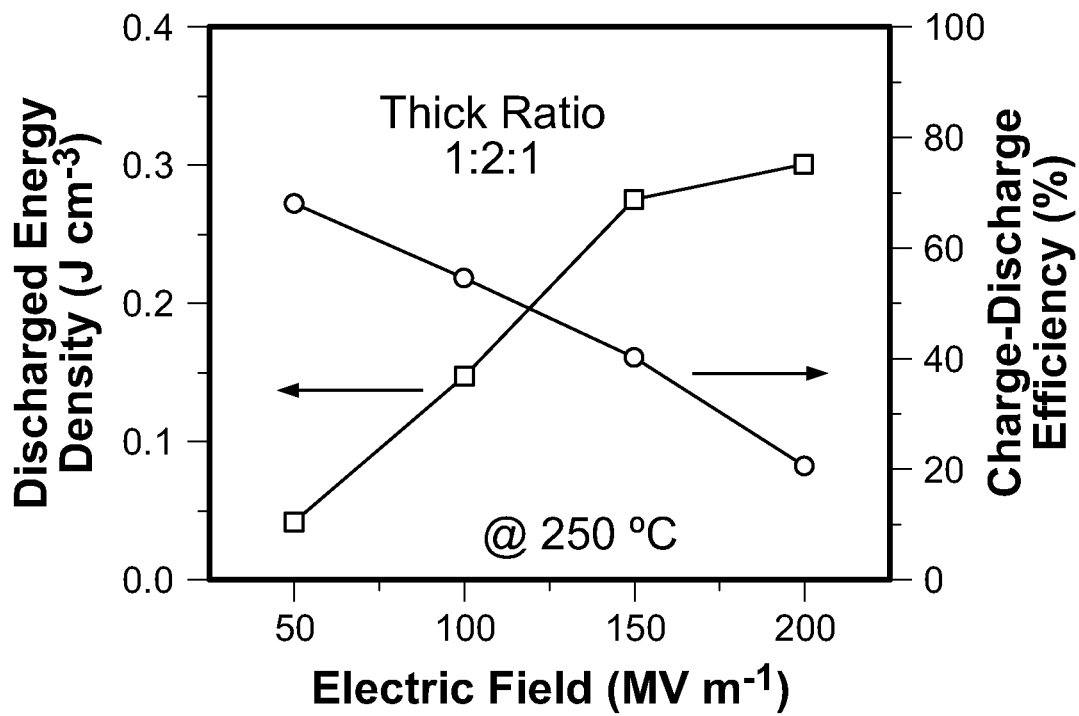
Figure 3G:
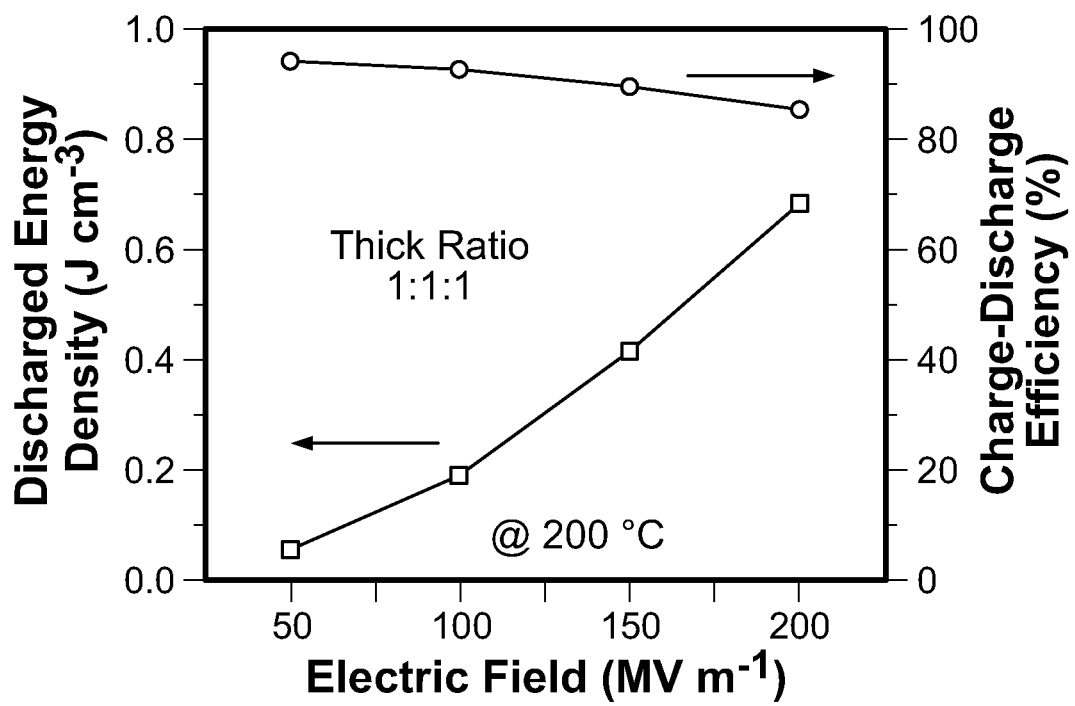
Figure 3H:
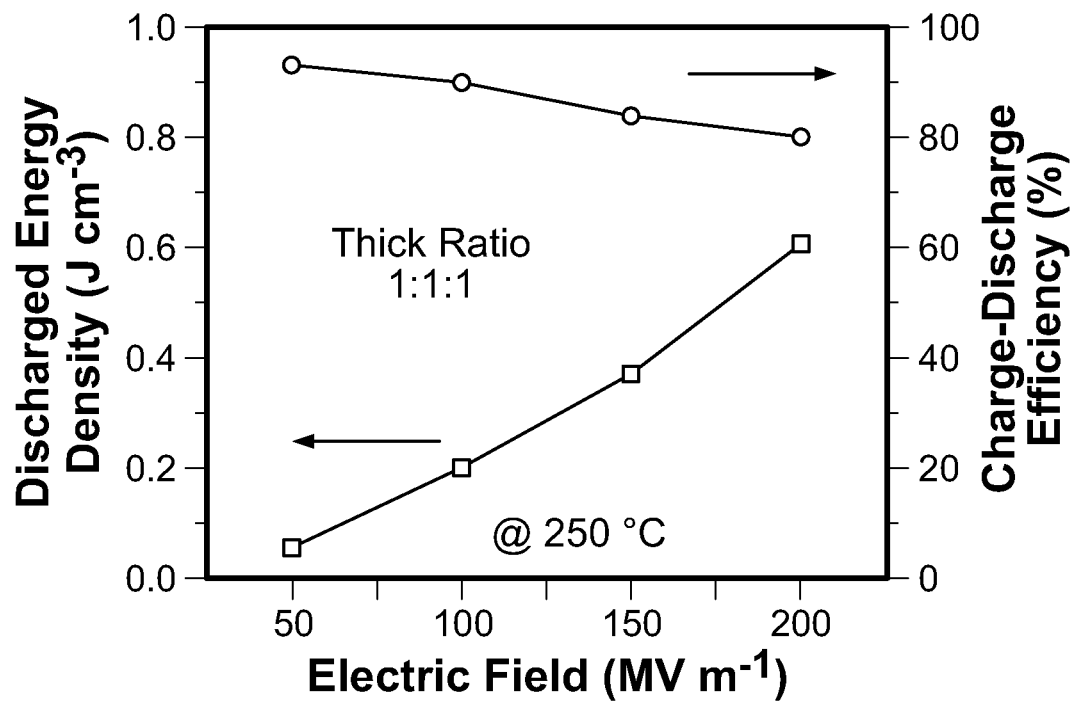
Figure 3I:
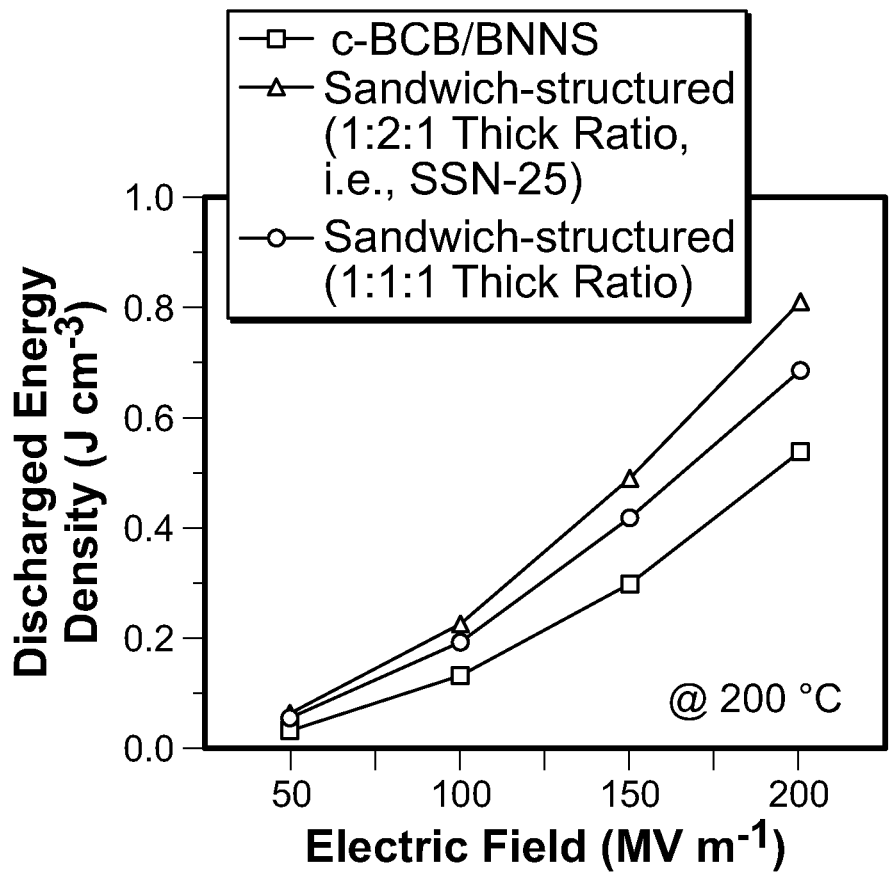
Figure 3J:
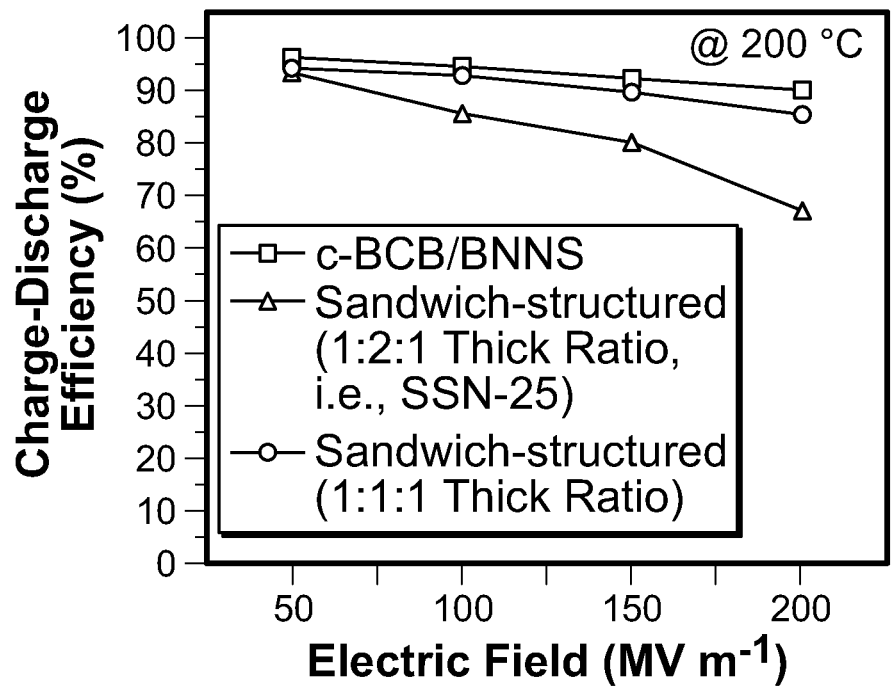
Figure 3K:
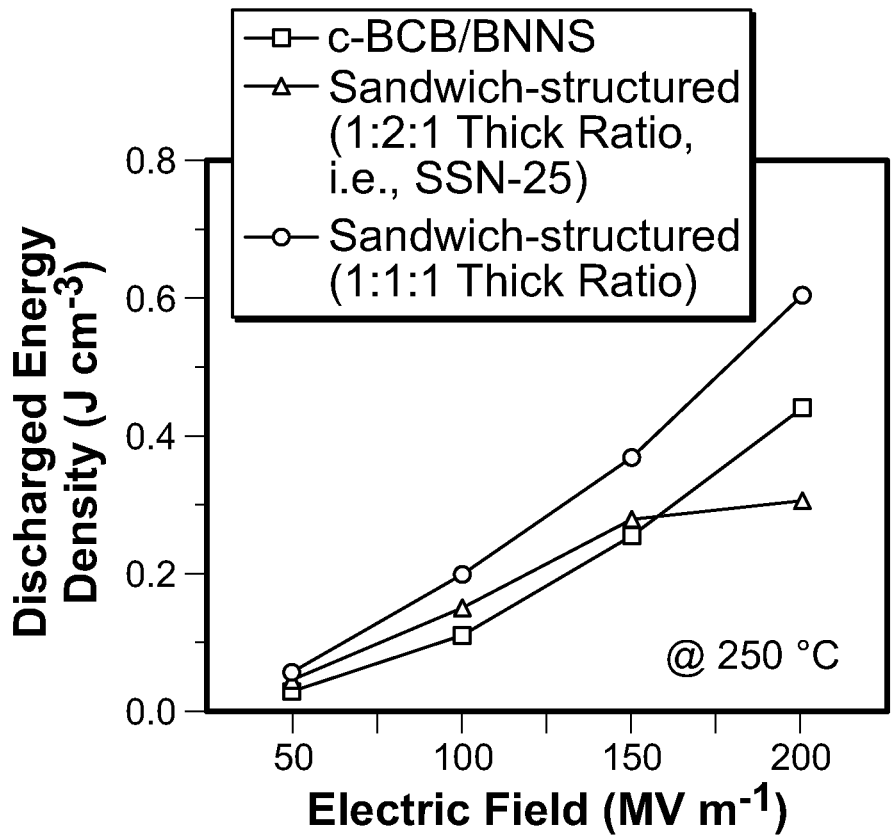
Figure 3L:
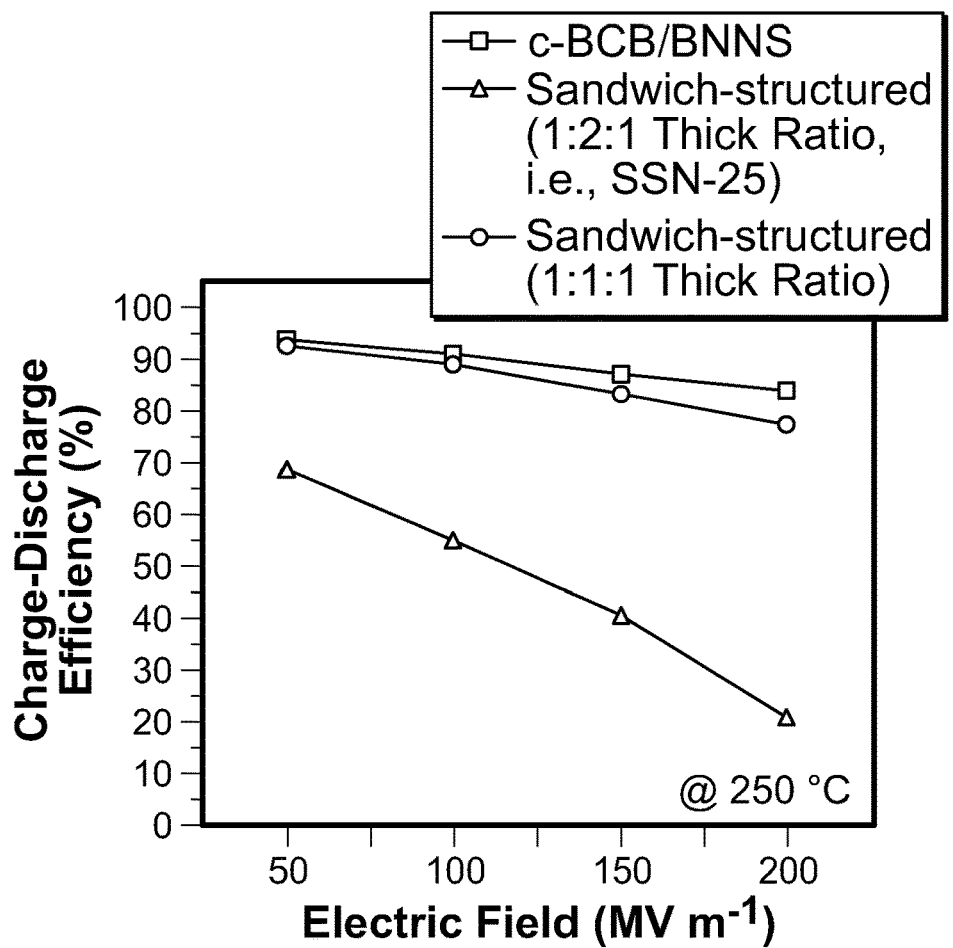

Referring to FIG. 3D, the discharged energy density of the SSN-25 sample reached 3.5 J $cm^{-3}$ at 366 MV $m^{-1}$ and even exceeded 4 J $cm^{-3}$ at an applied field of 400 MV $m^{-1}$, which largely surpassed the tested polymer-based dielectric materials attained at 150° C.

Referring to FIGS. 3E-3M, the discharged energy density of the sandwich-structured polymer nanocomposites were greater than that of the single-layered c-BCB/BNNS composites at even higher temperatures, e.g. 0.8 J $cm^{-3}$ for the SSN-25 sample at 200° C. and 0.6 J $cm^{-3}$ for the sandwich-structured polymer nanocomposite with a thick ratio of 1:1:1 at 250° C. versus 0.5 J $cm^{-3}$ at 200° C. and 0.4 J $cm^{-3}$ at 250° C. for the c-BCB/BNNS sample measured at 200 MV $m^{-1}$.

D. Fast Discharge and Power Density Testing at High Temperatures

To experimentally verify the discharging capability of the sandwich-structured nanocomposite at high temperatures, fast discharge tests were conducted and the energy dismissed to a load resistor in series with the sample was observed. The discharged energy density ($U_e$) was plotted as a function of time, where the discharge time is defined as the time for the discharged energy in a load resistor to reach 95% of the final value.

Figure 4A:
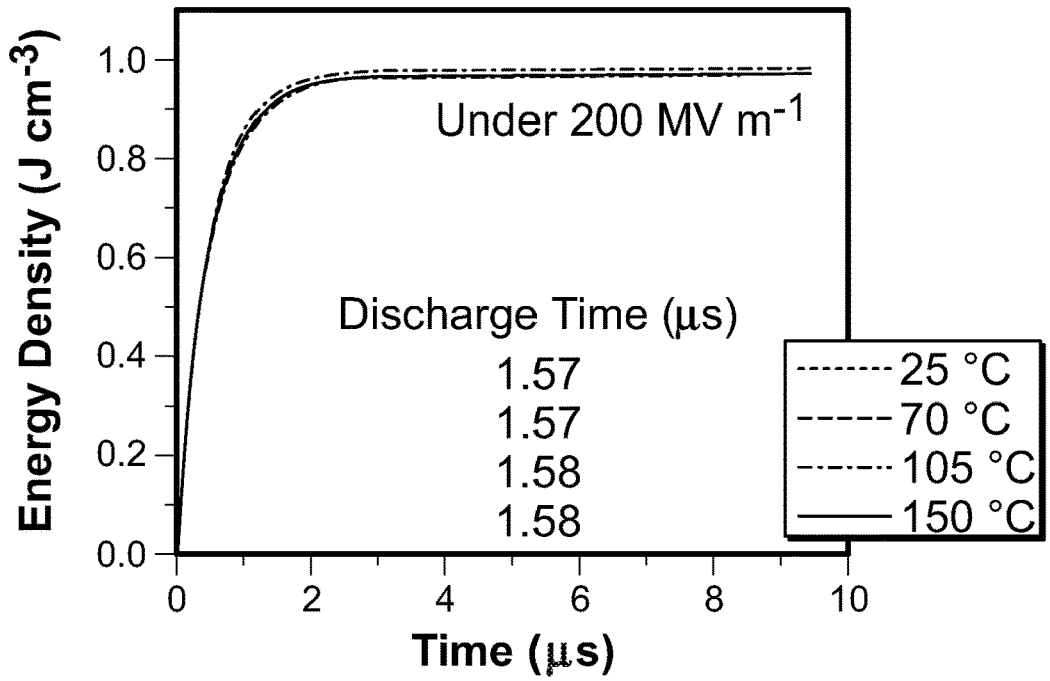
FIGS. 4A-4F are fast discharge test data plots of exemplary composites provided herein.
Figure 4B:
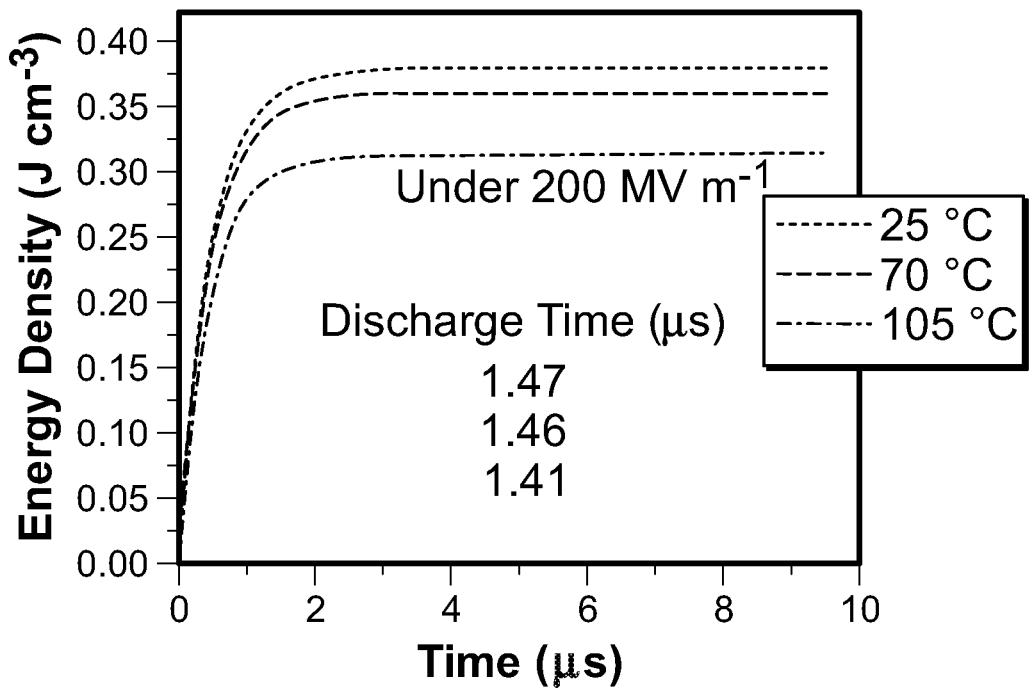
Figure 4C:
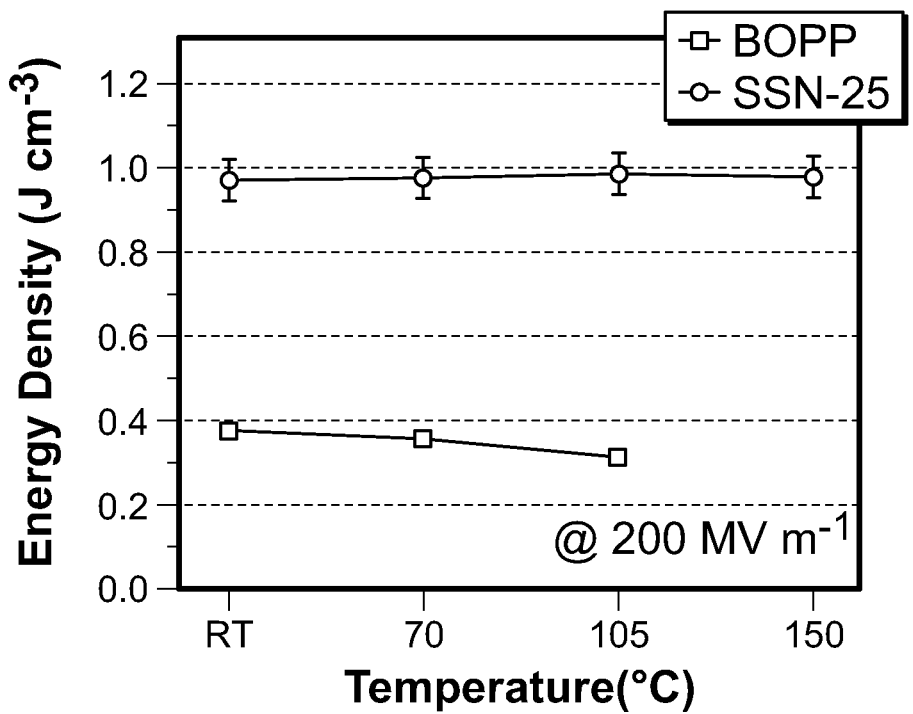
Figure 4D:
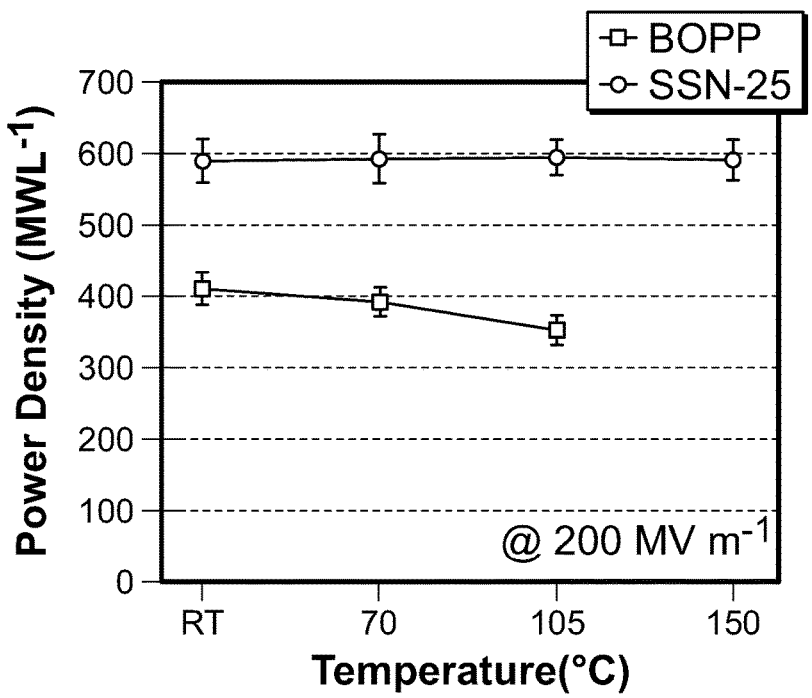

Referring to FIG. 4A, at 200 MV $m^{-1}$ and 150° C., the SSN-25 sample had a discharged energy density of more than 0.98 J $cm^{-3}$ at a rate of 1.58 μs. Referring to FIG. 4B, this energy density is 270% greater than the BOPP sample when discharged at 70° C., and 310% greater than the BOPP sample when released at 105° C. (i.e., the maximum operating temperature of the BOPP sample). Particularly, discharged energy density as well as the discharge time of the SSN-25 sample was found to remain constant in the temperature range of 25 to 150° C. On the other hand, referring to FIG. 4C, the BOPP sample exhibited systematic decreases in both the discharged energy density and discharge time with increasing temperature that was indicative of the instability of its capacitance with temperature. Based on the measured discharged energy density and discharge time, the power density (P) was calculated. As the discharge time is related to the capacitance and hence the thickness of the sample, the P-value of the BOPP sample was normalized using an identical thickness to that of the sandwich-structured nanocomposite employed in the fast discharge tests (i.e., 10 μm). The BOPP sample was observed possessing an inferior P value as compared to the sandwich-structured polymer nanocomposite, especially at elevated temperatures. In particular, referring to FIG. 4D, the P-value of the SSN-25 sample remained stable at 585 MW L$^{-1}$ from room temperature up to 150° C., whereas the P-value decreased with temperature and was 352 MW L$^{-1}$ for BOPP at 105° C. These results indicate that the sandwich-structured nanocomposite not only can offer a larger discharged energy density and higher stability at high temperatures, but can also provide greater P when compared to the BOPP sample.

E. Cyclability Testing at Elevated Temperatures.

Ideally, dielectric capacitors have unlimited lifetime given that their working principle involves solely the repeated electrical polarization and depolarization. However, continuous operation of polymer dielectrics under elevated temperatures and high electric fields may still cause degradation of performance, because under these conditions polymer dielectrics become much more vulnerable to the cyclic compression from the electrostatic force generated between the electrodes during charge-discharge cycles. Considering the above, the cyclic fast discharge experiments were conducted under an applied field of 200 MV m$^{-1}$ and at 150° C.

Figure 4E:
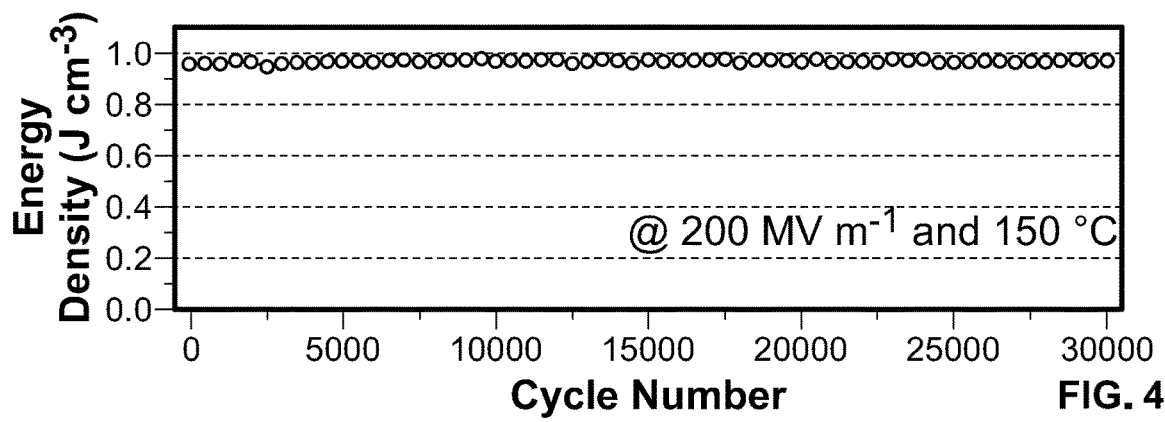

Referring to FIG. 4E, over a straight 30,000 cycles of charge-discharge (i.e., a 24-h continuous operation), the sandwich-structured polymer nanocomposite showed no sign of degradation, and the variation of the discharged energy density was less than 3% in comparison to the discharged energy density measured in the first cycle.

Figure 4F:
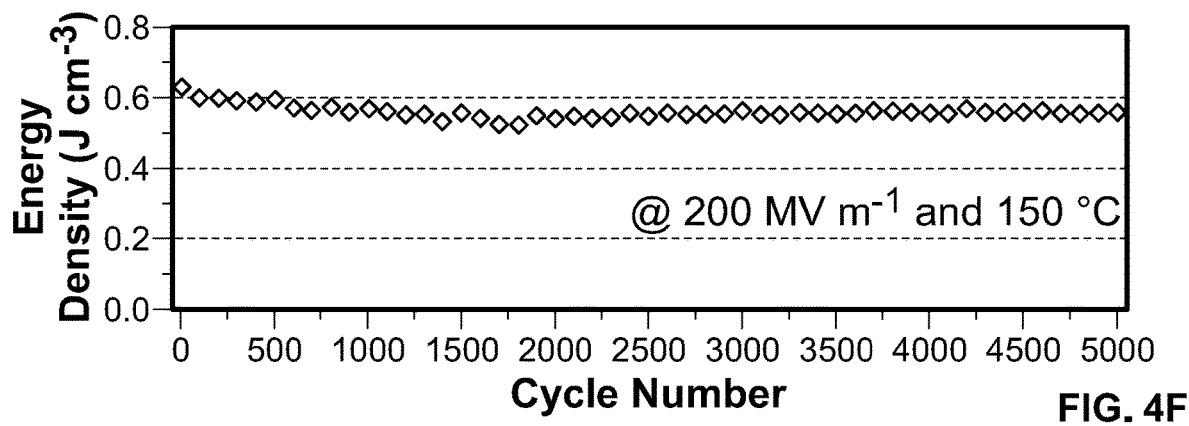

Referring to FIG. 4F, for comparison purposes, a sizable variation of the discharged energy density of over 16% was detected in the initial 5,000 cycles for the PEI sample.

The superior cyclic performance of the sandwich-structured nanocomposite over the PEI sample can be ascribed to the higher mechanical strength of the polymer nanocomposites at 150° C., e.g., the Young's modulus is 1.27 GPa for the SSN-25 sample and 0.31 GPa for the PEI sample.

F. Phase-Field Simulations and Discussion

Electronic conduction is a main reason behind the sharp increase in the dielectric loss as well as substantial reductions in the discharged energy density and the associated η-value of many dielectric materials when the materials are subjected to high applied fields and/or high temperatures.

Referring to FIG. 5, phase-field simulations were performed to show the simulated spatial distribution of the leakage current density in the polymer nanocomposites at 50 MV m$^{-1}$ and 150° C.

Figures 5A, 5B, 5C, 5D:
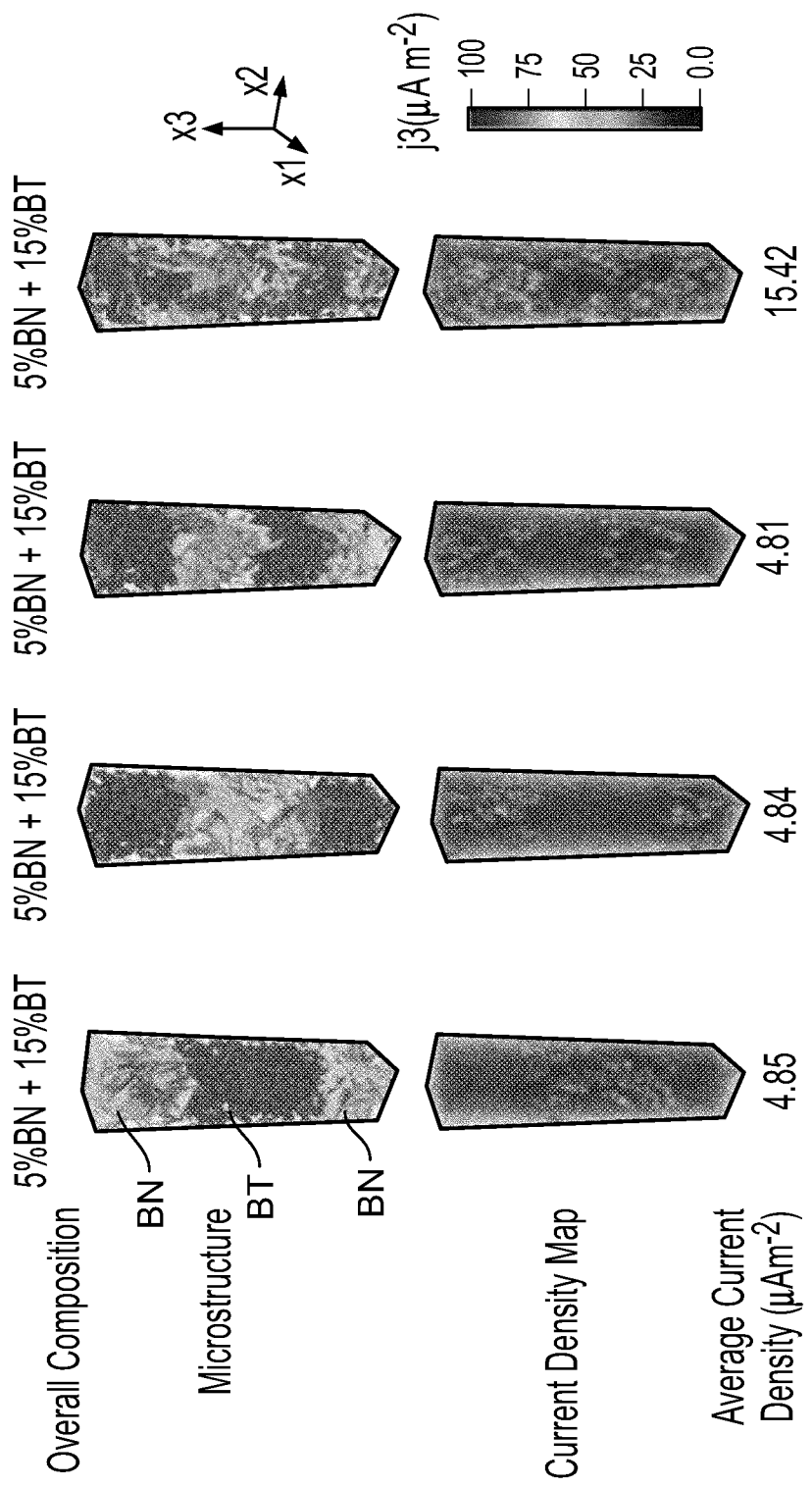
FIGS. 5A-5D are phase-field simulations of exemplary composites provided herein. The figures provide the composite microstructure (top figures) and spatial distribution of leakage current density (j) (bottom figures) when an electric field of 50 MV m$^{-1}$ at 150° C. is applied to a SSN-x nanocomposite (FIG. 5A), a reverse-SSN tri-layered polymer nanocomposite (FIG. 5B), a tetra-layered polymer nanocomposite (FIG. 5C), and a c-BCB/BNNS/BT single-layer polymer nanocomposite (FIG. 5D).

Referring to FIGS. 5A-5C, in the sandwich-structured composites having stacked c-BCB/BNNS and c-BCB/BT layers, the c-BCB/BNNS layers with highly insulating BNNSs blocked the current path, and therefore reduced the electrical conduction.

Referring to FIG. 5D, by contrast, in the ternary nanocomposites containing uniformly mixed BNNS and BT fillers, the relatively high-conductive BT NPs formed conductive paths, yielding much higher leakage current density relative to those in the multilayered structures; this corroborates the high electrical conduction and large dielectric loss experimentally observed in the single-layer ternary c-BCB/BNNS/BT nanocomposites. The computational simulations also suggested that tri- and tetra-layered polymer nanocomposites containing the layered c-BCB/BNNS and c-BCB/BT have very similar leakage current densities, and therefore provide comparable dielectrics operating characteristics at elevated temperature and high fields, as long as the c-BCB/BT phase is spatially severed along the film direction by the c-BCB/BNNS phase and the overall volume fraction of each individual nano-inclusion is fixed.

According to the simulation results shown in FIGS. 5A and 5B, the leakage current of the tri-layered structures appear to be irrelevant to the layer sequence when the c-BCB/BT layer is spatially separated by c-BCB/BNNS. To experimentally examine this prediction, the sandwich-structured nanocomposite film was constructed in a different sequence from the SSN-25 sample, i.e., the two c-BCB/BNNS layers were placed together between the two separate c-BCB/BT layers, while maintaining the same ratio of thickness and filler contents to those of the SSN-25 sample. The nanocomposite film thus obtained is denoted as "reverse-SSN."

Figure 6A:
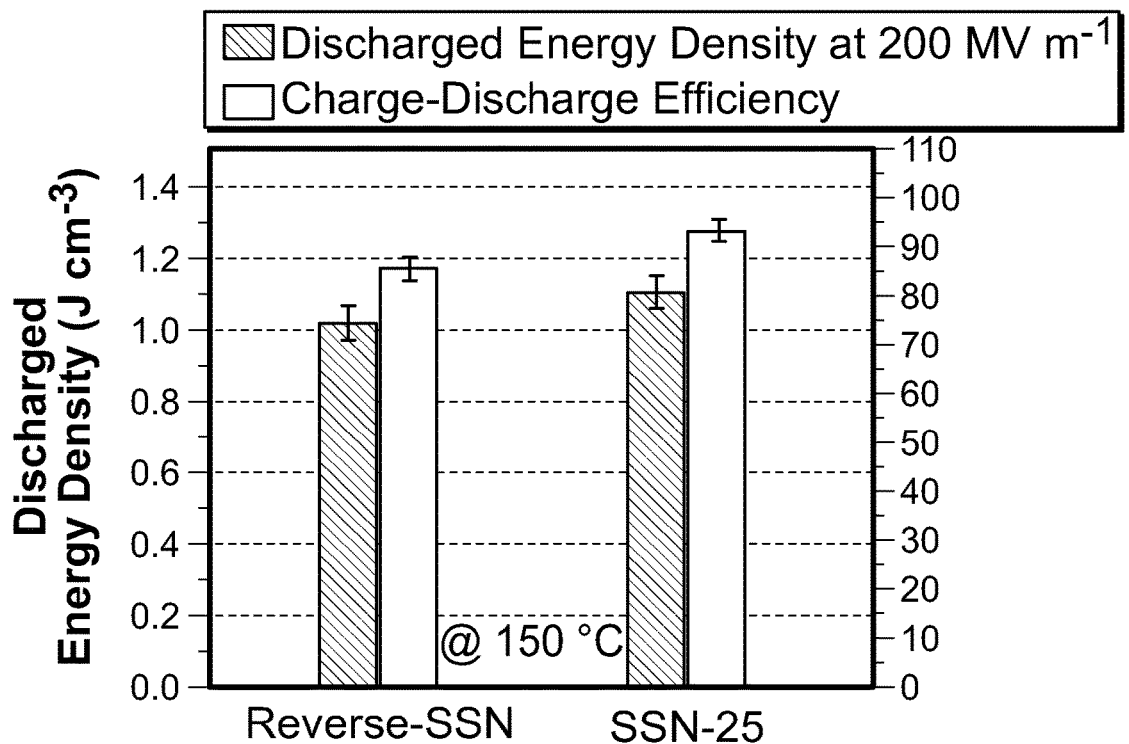
FIGS. 6A-6D are figures showing capacitive energy storage performance of various exemplary composites provided herein that demonstrate the impact of layer arrangement.

Referring to FIG. 6A, contrary to the simulation results, the reverse-SSN sample possessed a lower discharged energy density and η-value than the SSN-25 sample due to its higher conduction loss. It is therefore postulated that the electrode/dielectric interface, which is not considered in the simulation of the leakage current density, may account for the disparity in the experimental and theoretical results. In order to understand the sandwich-structured composites with different layer arrangements, the conduction mechanisms of its components, i.e., c-BCB/BNNS and c-BCB/BT, were investigated under elevated temperatures. Several conduction mechanisms exist in polymeric materials, including the hopping conduction, the Schottky charge injection (thermionic emission) and the Poole-Frenkel (P-F) emission. Hopping conduction is commonly observed in amorphous polymers such as c-BCB. The other two mechanisms are related to the thermal excitation of charge carriers and hence are considered as the major contributions to the high-temperature conduction loss. The Schottky emission is a conduction mechanism usually occurring at elevated temperatures when the electrons in electrode metal obtain energy provided by thermal activation to overcome the energy barrier at the electrode/dielectric interface and are injected to the dielectric material.

Figure 6B:
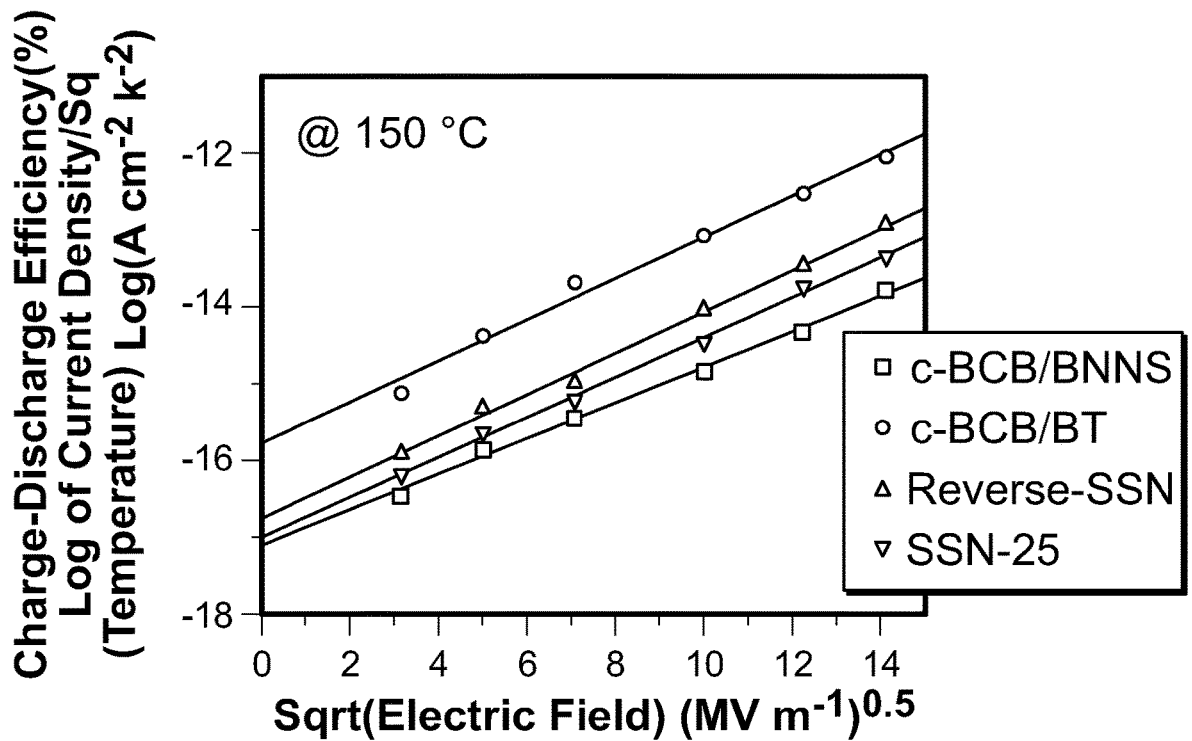

Referring to FIG. 6B, the barrier height was estimated from the intercept of the Schottky plot. The c-BCB/BT component had a much lower barrier height than the c-BCB/BNNS component, indicating that the charges are more easily injected from electrode into the c-BCB/BT component than the c-BCB/BNNS component at elevated temperatures. The P-F emission denotes the thermal excitation of electrons that emit from traps into the conduction band of dielectric.

Figure 6C:
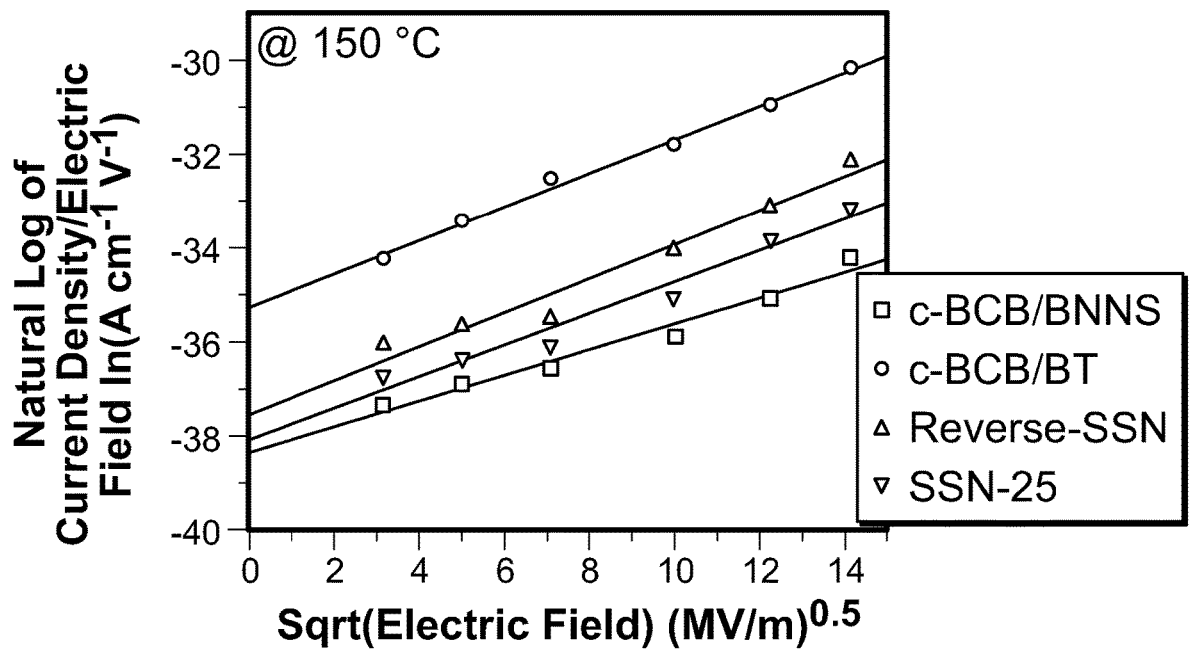

Referring to FIG. 6C, from the trap depth extracted from the intercept of the P-F plot, it is found that the presence of BNNSs facilitates the formation of deeper traps, and therefore impedes the thermal activation of electrons. Collectively, the SSN-25 sample features a higher energy barrier and a larger trap depth than the reverse-SSN sample as revealed by the curve fits in the Schottky and P-F plots. In other words, the c-BCB/BNNS components as the outer layers in the multilayered nanocomposites more efficiently blocked the charge injection from electrodes and restrained the formation of the thermally activated charge carriers at elevated temperatures when compared to the c-BCB/BT components.

Figure 6D:
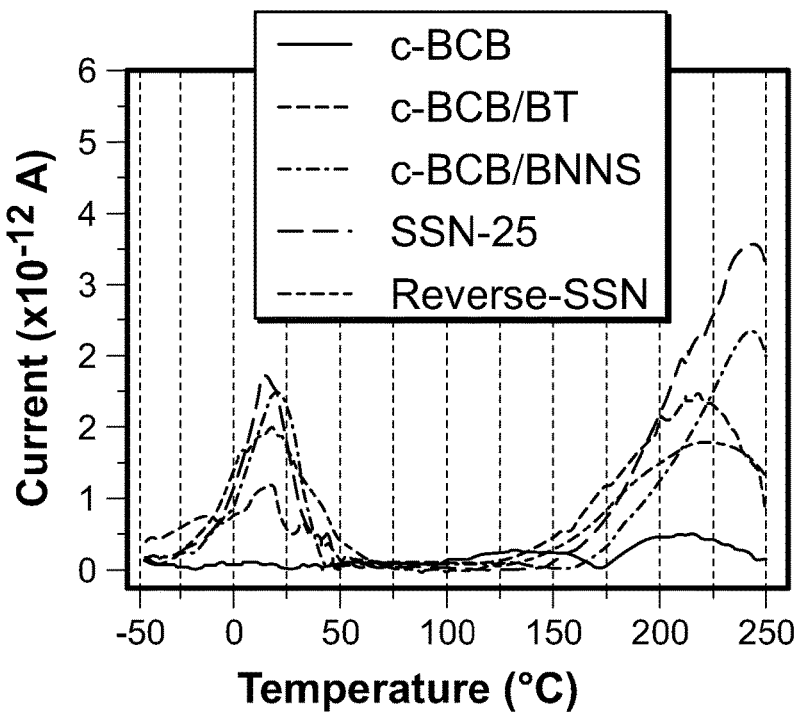

As shown in FIG. 6D, thermally stimulated depolarization current (TSDC) measurements were carried out on the c-BCB/BT and c-BCB/BNNS nanocomposites. The peaks located at lower temperature regions were likely associated with the Maxwell-Wagner effect at the filler/matrix interface, while the peaks at higher temperatures were attributed to the trapped charges. The upward shift of high-temperature peak from the c-BCB/BT component to the c-BCB/BNNS component suggested the formation of deeper traps and higher barriers against thermally activated charge carriers in the c-BCB/BNNS components. Since the TSDC is mainly contributed by the de-trapping of the charge carriers within about 5 μm film depth from the surface, the TSDC curve of the SSN-25 nanocomposite sample bore a pronounced peak at a very similar location to that of c-BCB/BNNS, while the curve of the reverse-SSN sample resembled that of c-BCB/BT. Consistent with the electrical conduction data, the results from TSDC measurements also indicated that it is beneficial for c-BCB/BNNS to be located in the surface layers in order to suppress conduction loss at high temperatures. Thus, the "BNNS-BT-BNNS" spatial configuration of the sandwich-structured polymer nanocomposite provides desirable properties for high-temperature applications.

Referring to FIGS. 3E-3M (note that "3I" was omitted as a figure identifier), the ratio of layer thickness in the sandwich-structured composites was also shown to affect the energy storage performance of the composite. It was demonstrated that the SSN-25 sample was the optimal composition possessing the best electrical energy storage and discharge properties at 150° C. While the increase of the relative thickness of c-BCB/BNNS resulted in a drop in the discharged energy density owing to the reduction in K, the decrease of the relative thickness of c-BCB/BNNS caused a reduction in η-value because of increased dielectric loss. For example, under 200 MV m$^{-1}$ and 150° C., the sandwich-structured nanocomposite with the ratio of thickness of the three layers in 1:1:1 exhibits a discharged energy density that is almost 20% lower than that of the SSN-25 sample, whereas the conduction loss of the sandwich-structured nanocomposite with the ratio of thickness of the three layers in 1:2:0.5 increased to over 15%.

G. Test Summary

In summary, the sandwich-structured composites containing high K-value ceramic fillers demonstrated high-energy-density high-power-density capacitive energy storage at elevated temperatures. The sandwich-structured composites with tailored multilayer structures and chemical compositions were capable of balancing divergent parameters that included energy density and dielectric loss at elevated temperatures, yielding surprising dielectric and capacitive performance at about 150° C. and above (e.g., up to 200° C.), a temperature oriented to many applications such as electric vehicles. The engineered spatial arrangement of BNNSs in the outer composite layer efficiently impeded the charge injection from electrodes and introduced deep traps for charge carriers at elevated temperatures, whereas BT NPs in the inner layer provided improved dielectric constant and hence energy density. Consequently, a discharged energy density of 1.1 J cm$^{-3}$ with a η-value of 93% have been realized in the sandwich-structured polymer nanocomposites at 150° C. and 200 MV m$^{-1}$. More notably, in addition to excellent charge-discharge cyclic performance at elevated temperatures, the discharge power and the microsecond discharge speed of the sandwich-structured composites remain steady with respect to the operating temperatures from 25 to 150° C. The spatial organization of composites into layered structures provides new paradigms for developing high-performance high-temperature dielectric materials and for gaining improved insights into the mechanisms that control dielectric and capacitive properties in polymeric materials at high temperatures.

Characterization of Test Samples

Various methods were used for characterizing the samples discussed herein.

SEM measurements were performed with a Hitachi S-4800 field emission electron microscope. Gold electrodes of diameter 6 mm and thickness 60 nm were sputtered on both sides of the polymer films for the electrical measurements. Dielectric constant and loss were measured using an Agilent LCR meter (E4980A).

Dielectric spectra were acquired over a broad temperature range using a Hewlett Packard 4284A LCR meter in conjunction with a Delta Design oven model 2300.

Conduction currents were obtained under an electric field provided by a Hewlett Packard 4140B pA meter/voltage source and TREK model 2210 amplifier.

High-field D-E loops were collected using a modified Sawyer-Tower circuit, where the samples were subjected to a triangular unipolar wave with a frequency of 10 Hz.

Dielectric breakdown strength measurements were performed on a TREK P0621P instrument using the electrostatic pull-down method under a DC voltage ramp of 500 V s$^{-1}$.

TSDC was measured using Hewlett Packard 4140B pA meter with Kepco BOP 1000M as a high voltage source and performed in a Delta Design 2300 oven, using the following recipe. The samples were first heated to 200° C. at the rate of 5° C. min$^{-1}$, and were annealed for 10 min at 200° C. before an electric field of 50 MV m$^{-1}$ was applied. After another 10-min annealing, the samples were rapidly cooled down to −50° C. with the applied electric field. Afterwards, the samples were placed at −50° C. for 10 min and then the electric field was removed. Finally the samples were short circuited and heated to 250° C. at the rate of 3° C. min$^{-1}$ with the current being measured across the samples.

The fast discharge tests were performed using a PK-CPR1502 test system (PolyK Technologies). A Trek 10/10B high voltage amplifier was used to charge the capacitor sample soaked in silicone dielectric fluid and the typical charging time was about 1 second. Then the charged capacitor was discharged to a high voltage non-inductive resistor through a high speed MOSFET switch. The resistance of the load resistor was selected as 6.5 kΩ to match the capacitance of the sample and achieve certain discharge RC time constant. The charge-discharge cycle was controlled by a LabVIEW program.

We claim:

1. A composite comprising:
   a first layer comprising a polymer and an insulating inorganic filler, wherein the insulating inorganic filler is selected from the group consisting of boron nitride, silica, clay, alumina, aluminium nitride, diamond, and combinations thereof;
   a second layer comprising the polymer and a polarizing inorganic filler; and
   a third layer comprising a same or substantially similar composition to the first layer or the second layer;

wherein the polymer has a glass transition temperature or a degradation temperature of about or greater than about 150° C.; and wherein the composite has a discharged energy density of about or greater than 0.6 J cm$^{-3}$, a charge-discharge efficiency of about or greater than 75%, and a dielectric constant of about or greater than 4, over a temperature range of about 20° C. to about 150° C. and with an applied alternating electric field having a frequency ranging from about 100 Hz to about 1 MHz, and a maximum operating electric field strength of at least 200 megavolt per meter.

2. The composite of claim 1, wherein the insulating inorganic filler comprises boron nitride.

3. The composite of claim 1, wherein the polarizing inorganic filler is selected from the group consisting of zirconium dioxide, tantalum pentoxide, barium strontium titanate ("BST"), lead zirconate titanate ("PZT"), lead magnesium niobate-lead titanate ("PMN-PT"), and combinations thereof.

4. The composite of claim 1, wherein the polarizing inorganic filler comprises barium titanate.

5. An article comprising a film, wherein the film comprises the composite of claim 1.

6. An article comprising a capacitor, wherein the capacitor comprises the composite of claim 1.

7. The article of claim 6, wherein the capacitor is an electric vehicle capacitor.

8. The composite of claim 1, wherein the third layer comprises a same or substantially similar composition to the first layer, and the first and third layers are outer layers and the second layer is an inner layer disposed therebetween.

9. The composite of claim 1, wherein the third layer comprises a same or substantially similar composition to the second layer, and wherein the second layer and third layers are outer layers and the first layer is an inner layer disposed therebetween.

10. The composite of claim 5, wherein the insulating inorganic filler comprises boron nitride.

11. The article of claim 5, wherein the polarizing inorganic filler is selected from the group consisting of zirconium dioxide, tantalum pentoxide, barium strontium titanate ("BST"), lead zirconate titanate ("PZT"), lead magnesium niobate-lead titanate ("PMN-PT"), and combinations thereof.

12. The article of claim 5, wherein the polarizing inorganic filler comprises barium titanate.

13. The article of claim 5, wherein the third layer comprises a same or substantially similar composition to the first layer, and the first and third layers are outer layers and the second layer is an inner layer disposed therebetween.

14. The article of claim 5, wherein the third layer comprises a same or substantially similar composition to the second layer, and wherein the second layer and third layers are outer layers and the first layer is an inner layer disposed therebetween.

15. The article of claim 6, wherein the polarizing inorganic filler is selected from the group consisting of zirconium dioxide, tantalum pentoxide, barium strontium titanate ("BST"), lead zirconate titanate ("PZT"), lead magnesium niobate-lead titanate ("PMN-PT"), and combinations thereof.

16. The article of claim 6, wherein the polarizing inorganic filler comprises barium titanate.

17. The article of claim 6, wherein the third layer comprises a same or substantially similar composition to the first layer, and the first and third layers are outer layers and the second layer is an inner layer disposed therebetween.

18. The article of claim 6, wherein the third layer comprises a same or substantially similar composition to the second layer, and wherein the second layer and third layers are outer layers and the first layer is an inner layer disposed therebetween.

19. A composite comprising:

a first layer comprising a polymer and an insulating inorganic filler;

a second layer comprising the polymer and a polarizing inorganic filler; and a third layer comprising a same or substantially similar composition to the first layer or the second layer;

wherein the polymer has a glass transition temperature or a degradation temperature of about or greater than about 150° C.;

wherein the polymer is a crosslinked polymer, and where the crosslinked polymer comprises an epoxy, an unsaturated polyester, a polyimide, a bismaleimide polymer, a bismaleimide triazine polymer, a cyanate ester polymer, a benzoxazine polymer, a benzocyclobutene polymer, a polyalkyd, a phenol-formaldehyde polymer, a novolac, a resole, a melamine-formaldehyde polymer, a urea-formaldehyde polymer, a hydroxymethylfuran, an unsaturated polyesterimide or combinations thereof; and wherein the composite has a discharged energy density of about or greater than 0.6 J cm$^{-3}$, a charge-discharge efficiency of about or greater than 75%, and a dielectric constant of about or greater than 4, over a temperature range of about 20° C. to about 150° C. and with an applied alternating electric field having a frequency ranging from about 100 Hz to about 1 MHz, and a maximum operating electric field strength of at least 200 megavolt per meter.

20. The composite of claim 19, wherein the polymer comprises crosslinked divinyltetramethyldisiloxane-bis(benzocyclobutene).

21. The composite of claim 19, wherein the polymer comprises the following structure:

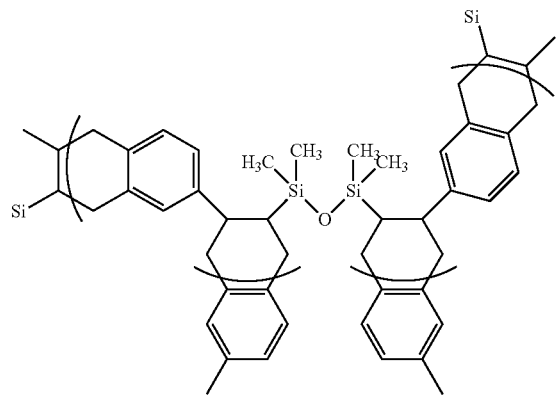

22. The composite of claim 19, wherein the third layer comprises a same or substantially similar composition to the first layer, and the first and third layers are outer layers and the second layer is an inner layer disposed therebetween.

23. The composite of claim 19, wherein the third layer comprises a same or substantially similar composition to the second layer, and wherein the second layer and third layers are outer layers and the first layer is an inner layer disposed therebetween.

24. The composite of claim 19, wherein the polarizing inorganic filler is selected from the group consisting of zirconium dioxide, tantalum pentoxide, barium strontium titanate ("BST"), lead zirconate titanate ("PZT"), lead magnesium niobate-lead titanate ("PMN-PT"), and combinations thereof.

25. An article comprising a film, wherein the film comprises the composite of claim 19.

26. The article of claim 25, wherein the polymer comprises crosslinked divinyltetramethyldisiloxane-bis(benzocyclobutene).

27. The article of claim 25, wherein the polymer comprises the following structure:

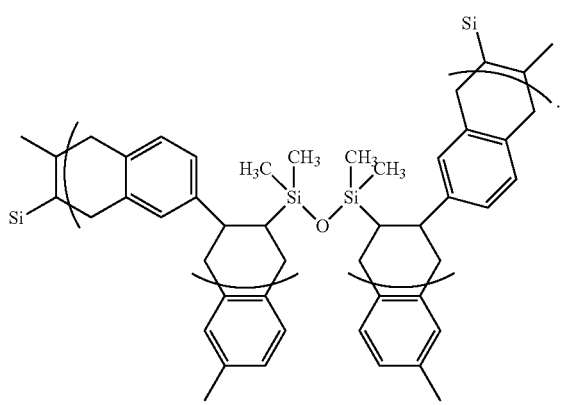

28. The article of claim 25, wherein the third layer comprises a same or substantially similar composition to the first layer, and the first and third layers are outer layers and the second layer is an inner layer disposed therebetween.

29. The article of claim 25, wherein the third layer comprises a same or substantially similar composition to the second layer, and wherein the second layer and third layers are outer layers and the first layer is an inner layer disposed therebetween.

30. The article of claim 25, wherein the polarizing inorganic filler is selected from the group consisting of zirconium dioxide, tantalum pentoxide, barium strontium titanate ("BST"), lead zirconate titanate ("PZT"), lead magnesium niobate-lead titanate ("PMN-PT"), and combinations thereof.

31. An article comprising a capacitor, wherein the capacitor comprises the composition of claim 19.

32. The article of claim 31, wherein the capacitor is an electric vehicle capacitor.

33. The article of claim 31, wherein the polymer comprises crosslinked divinyltetramethyldisiloxane-bis(benzocyclobutene).

34. The article of claim 31, wherein the polymer comprises the following structure:

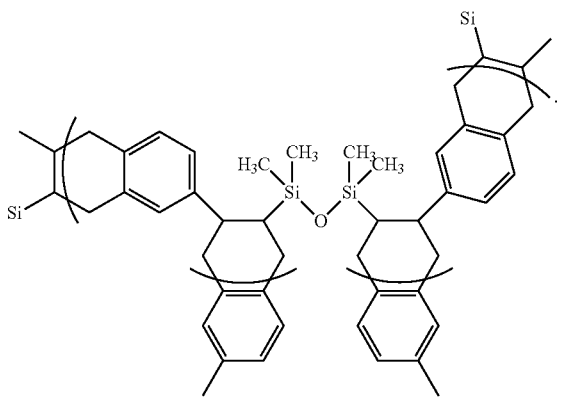

35. The article of claim 31, wherein the third layer comprises a same or substantially similar composition to the first layer, and the first and third layers are outer layers and the second layer is an inner layer disposed therebetween.

36. The article of claim 31, wherein the third layer comprises a same or substantially similar composition to the second layer, and wherein the second layer and third layers are outer layers and the first layer is an inner layer disposed therebetween.

37. A composite comprising:
a first layer comprising a polymer and an insulating inorganic filler;
a second layer comprising the polymer and a polarizing inorganic filler; and
a third layer comprising a same or substantially similar composition to the first layer or the second layer;
wherein the polymer has a glass transition temperature or a degradation temperature of about or greater than about 150° C.;
wherein the polymer has a dielectric constant of greater than 2.5 over a temperature range of about 20° C. to about 150° C.; and
wherein the composite has a discharged energy density of about or greater than 0.6 J cm$^{-3}$, a charge-discharge efficiency of about or greater than 75%, and a dielectric constant of about or greater than 4, over a temperature range of about 20° C. to about 150° C. and with an applied alternating electric field having a frequency ranging from about 100 Hz to about 1 MHz, and a maximum operating electric field strength of at least 200 megavolt per meter.

38. The composite of claim 37, wherein the polymer has an energy density of greater than 0.5 J cm$^{-1}$ over a temperature range of about 20° C. to about 150° C.

39. The composite of claim 37, wherein the polymer has a charge-discharge efficiency of greater than 80% over a temperature range of about 20° C. to about 150° C.

40. The composite of claim 37, wherein the composite is a three-layered structure.

41. The composite of claim 37, wherein the first layer, the second layer, the third layer, or two or more thereof, each includes a thickness of about 8 microns to about 20 microns.

42. The composite of claim 37, wherein the first layer, the second layer, the third layer, or two or more thereof, each includes a thickness less than 20 microns.

43. An article comprising a film, wherein the film comprises the composite of claim 37.

44. The article of claim 43, wherein the polymer has an energy density of greater than 0.5 J cm$^{-1}$ over a temperature range of about 20° C. to about 150° C.

45. The article of claim 43, wherein the polymer has a charge-discharge efficiency of greater than 80% over a temperature range of about 20° C. to about 150° C.

46. The article of claim 43, wherein the composite is a three-layered structure.

47. The article of claim 43, wherein the first layer, the second layer, the third layer, or two or more thereof, each includes a thickness of about 8 microns to about 20 microns.

48. The article of claim 43, wherein the first layer, the second layer, the third layer, or two or more thereof, each includes a thickness less than 20 microns.

49. An article comprising a capacitor, wherein the capacitor comprises the composition of claim 37.

50. The article of claim 49, wherein the capacitor is an electric vehicle capacitor.

51. The article of claim 49, wherein the polymer has an energy density of greater than 0.5 J cm$^{-1}$ over a temperature range of about 20° C. to about 150° C.

52. The article of claim 49, wherein the polymer has a charge-discharge efficiency of greater than 80% over a temperature range of about 20° C. to about 150° C.

53. The article of claim 49, wherein the composite is a three-layered structure.

54. The article of claim 49, wherein the first layer, the second layer, the third layer, or two or more thereof, each includes a thickness of about 8 microns to about 20 microns.

55. A composite comprising:
 a first layer comprising a polymer and an insulating inorganic filler, wherein the first layer comprises the insulating inorganic filler in a volume fraction ranging from about 1 to 25 vol. %;
 a second layer comprising the polymer and a polarizing inorganic filler; and
 a third layer comprising a same or substantially similar composition to the first layer or the second layer;
 wherein the polymer has a glass transition temperature or a degradation temperature of about or greater than about 150° C.; and
 wherein the composite has a discharged energy density of about or greater than 0.6 J cm$^{-3}$, a charge-discharge efficiency of about or greater than 75%, and a dielectric constant of about or greater than 4, over a temperature range of about 20° C. to about 150° C. and with an applied alternating electric field having a frequency ranging from about 100 Hz to about 1 MHz, and a maximum operating electric field strength of at least 200 megavolt per meter.

56. The composite of claim 55, wherein the second layer comprises the polarizing filler in a volume fraction ranging from about 10 to about 35 vol. %.

57. The composite of claim 55, wherein the second layer comprises the polarizing filler in a volume fraction ranging from about 20 to about 30 vol. %.

58. The composite of claim 55, wherein the third layer comprises a same or substantially similar composition to the first layer, and the first and third layers are outer layers and the second layer is an inner layer disposed therebetween.

59. The composite of claim 55, wherein the third layer comprises a same or substantially similar composition to the second layer, and wherein the second layer and third layers are outer layers and the first layer is an inner layer disposed therebetween.

60. The composite of claim 55, wherein the polarizing inorganic filler is selected from the group consisting of zirconium dioxide, tantalum pentoxide, barium strontium titanate ("BST"), lead zirconate titanate ("PZT"), lead magnesium niobate-lead titanate ("PMN-PT"), and combinations thereof.

61. An article comprising a film, wherein the film comprises the composite of claim 55.

62. The article of claim 61, wherein the second layer comprises the polarizing filler in a volume fraction ranging from about 10 to about 35 vol. %.

63. The article of claim 61, wherein the second layer comprises the polarizing filler in a volume fraction ranging from about 20 to about 30 vol. %.

64. The article of claim 61, wherein the third layer comprises a same or substantially similar composition to the first layer, and the first and third layers are outer layers and the second layer is an inner layer disposed therebetween.

65. The article of claim 61, wherein the third layer comprises a same or substantially similar composition to the second layer, and wherein the second layer and third layers are outer layers and the first layer is an inner layer disposed therebetween.

66. The article of claim 61, wherein the polarizing inorganic filler is selected from the group consisting of zirconium dioxide, tantalum pentoxide, barium strontium titanate ("BST"), lead zirconate titanate ("PZT"), lead magnesium niobate-lead titanate ("PMN-PT"), and combinations thereof.

67. An article comprising a capacitor, wherein the capacitor comprises the composition of claim 55.

68. The article of claim 67, wherein the capacitor is an electric vehicle capacitor.

69. The article of claim 67, wherein the second layer comprises the polarizing filler in a volume fraction ranging from about 10 to about 35 vol. %.

70. The article of claim 67, wherein the second layer comprises the polarizing filler in a volume fraction ranging from about 20 to about 30 vol. %.

71. The article of claim 67, wherein the third layer comprises a same or substantially similar composition to the first layer, and the first and third layers are outer layers and the second layer is an inner layer disposed therebetween.

72. The article of claim 67, wherein the third layer comprises a same or substantially similar composition to the second layer, and wherein the second layer and third layers are outer layers and the first layer is an inner layer disposed therebetween.

* * * * *